(12) United States Patent
Walkush et al.

(10) Patent No.: US 7,571,213 B2
(45) Date of Patent: Aug. 4, 2009

(54) INTERACTIVE ELECTRONIC BUBBLE MESSAGING

(75) Inventors: Joseph Walkush, New York, NY (US); Melora Zaner, Seattle, WA (US); Tammy Savage, Seattle, WA (US); Eun-Kyung Chung, Redmond, WA (US); Caroline Rockey, Seattle, WA (US); Eugene Mesgar, Palo Alto, CA (US); Heather Ferguson, Ithaca, NY (US); Kathleen Mulcahy, Brighton, MA (US)

(73) Assignee: Microsoft Corporation, Redmond, WA (US)

( * ) Notice: Subject to any disclaimer, the term of this patent is extended or adjusted under 35 U.S.C. 154(b) by 828 days.

(21) Appl. No.: 10/811,035

(22) Filed: Mar. 26, 2004

(65) Prior Publication Data

US 2005/0216568 A1 Sep. 29, 2005

(51) Int. Cl.
*G06F 15/16* (2006.01)
(52) U.S. Cl. .................. 709/206; 709/204; 709/207; 715/751; 715/758
(58) Field of Classification Search .................. 709/206
See application file for complete search history.

(56) References Cited

U.S. PATENT DOCUMENTS

| | | | |
|---|---|---|---|
| 5,426,594 A | | 6/1995 | Wright et al. |
| 5,544,305 A | * | 8/1996 | Ohmaye et al. ............. 715/776 |
| 6,321,211 B1 | * | 11/2001 | Dodd .......................... 705/26 |
| 6,731,323 B2 | * | 5/2004 | Doss et al. ............... 348/14.01 |
| 6,784,901 B1 | * | 8/2004 | Harvey et al. ................ 715/757 |
| 6,990,452 B1 | * | 1/2006 | Ostermann et al. ........... 704/260 |
| 7,130,817 B2 | * | 10/2006 | Karas et al. .................... 705/26 |
| 7,131,003 B2 | * | 10/2006 | Lord et al. ................... 713/168 |
| 7,164,423 B1 | * | 1/2007 | Westen ........................ 345/473 |
| 7,188,143 B2 | * | 3/2007 | Szeto ........................... 709/206 |
| 7,266,533 B2 | * | 9/2007 | Karas et al. .................... 706/26 |
| 2002/0032861 A1 | * | 3/2002 | Azuma ........................ 713/170 |
| 2002/0103867 A1 | * | 8/2002 | Schilter ....................... 709/206 |
| 2002/0178087 A1 | * | 11/2002 | Henderson et al. ............ 705/26 |
| 2004/0215731 A1 | * | 10/2004 | Tzann-en Szeto ........... 709/207 |

OTHER PUBLICATIONS

Addams, Shay, "1986 in Review: What's Made News on the Networks", *Family Computing*, vol. 4, No. 12, pp. 30 & 32 (Dec. 1986).

(Continued)

*Primary Examiner*—Ario Etienne
*Assistant Examiner*—Blake Rubin
(74) *Attorney, Agent, or Firm*—Lee & Hayes, PLLC

(57) ABSTRACT

Bubble messaging may include creating a bubble message and seamlessly sending the bubble message to one or more recipients. The bubble message may include message text and a bubble message shape specification. As a result of the bubble message being sent, a notification of the bubble message may be received. The notification of the bubble message may be displayed and, in response to recipient interaction with the displayed notification, a bubble message open animation may be displayed that provides a transition to a shape specified by the bubble message shape specification. The bubble message may be displayed with the shape specified by the bubble message shape specification. A bubble message editor may be configured to enable the creation and seamless sending of the bubble message. A bubble message viewer may be configured to enable the display of bubble messages. The bubble message may be unmodifiable after creation.

25 Claims, 23 Drawing Sheets

OTHER PUBLICATIONS

Anonymous, "The Next Generation", *Chain Store Age Supplement*, vol. 78, No. 2, pp. 3A (Feb. 2002).

Anonymous, "Meeting the Needs of the Modern Shopper", *Chain Store Age Supplement*, vol. 78, No. 2, pp. 4A (Feb. 2002).

Anonymous, "Sharpening the Competitive Edge", *Chain Store Age Supplement*, vol. 78, No. 2, pp. 6A (Feb. 2002).

Anonymous, "A Cross-Channel Approach to Net Sales", *Chain Store Age Supplement*, vol. 78, No. 2, pp. 8A (Feb. 2002).

Anonymous, "At Spencer Gifts, Sales are in the Cards", *Chain Store Age Supplement*, vol. 78, No. 2, pp. 10A (Feb. 2002).

Anonymous, "Cards, Dollars and Cents", *Chain Store Age Supplement*, vol. 78, No. 2, pp. 11A (Feb. 2002).

Barron, James, "Re: Seanson's Greetings (smiley face optional)—As a Shortcut or a Way around the Post Office, E-mail Cards Often Come with a Personal Touch", *The New York Times*, pp. G1, G6 (Dec. 20, 2001).

Cotone, Mark, "Color Mail", *Commodore Magazine*, vol. 8, No. 1, p. 28 (Jan. 1987).

Farnum, Chris, "Redesigning an E-business Taxonomy: Egreetings Project Case Study", *Bulletin of the American Society for Information Science and Technology*, vol. 28, No. 5, pp. 10-13 (Jun./Jul. 2002).

O'Leary, Mick, "Ecards Ease Greeting Card Woes", *EContent*, vol. 23, No. 1, pp. 83-84 (Feb./Mar. 2000).

Smith, Steve, "Roses are Red and Subscriptions are Green (Electronic Greeting Cards)", *EContent*, vol. 25, No. 8, pp. 40-43 (Aug. 2002).

Tucker, Susan A., "Electronic Mail Connections", *Online*, vol. 11, No. 4, pp. 52-62 (Jul. 1987).

* cited by examiner

| Bubble Message Version Data | |
| --- | --- |
| | 1204 |

| Bubble Message Identification Data | |
| --- | --- |
| | 1206 |

| Bubble Message Sender Data | |
| --- | --- |
| | 1208 |

| Bubble Message Iconic Shape Data | |
| --- | --- |
| | 1210 |

| Bubble Message Shape Data | |
| --- | --- |
| | 1212 |

| Bubble Message Body Data | |
| --- | --- |
| | 1214 |

| Bubble Message Animation Data | |
| --- | --- |
| | 1216 |

| Bubble Message Feature Data | |
| --- | --- |
| | 1218 |

| Bubble Message Feature Unlock Data | |
| --- | --- |
| | 1220 |

| Bubble Message Customization Data | |
| --- | --- |
| | 1222 |

Bubble Message Data

Bubble Message Open Animation
1604

Bubble Message Close Animation
1606

Bubble Message Animation Data
1602

FIG. 16

Bubble Message Viewer Feature(s)
1704

Bubble Message Savable
1706

Bubble Message Modifiable
1708

Bubble Message Tradable
1710

Bubble Message Copiable
1712

Bubble Message Printable
1714

Bubble Message Feature Data
1702

FIG. 17

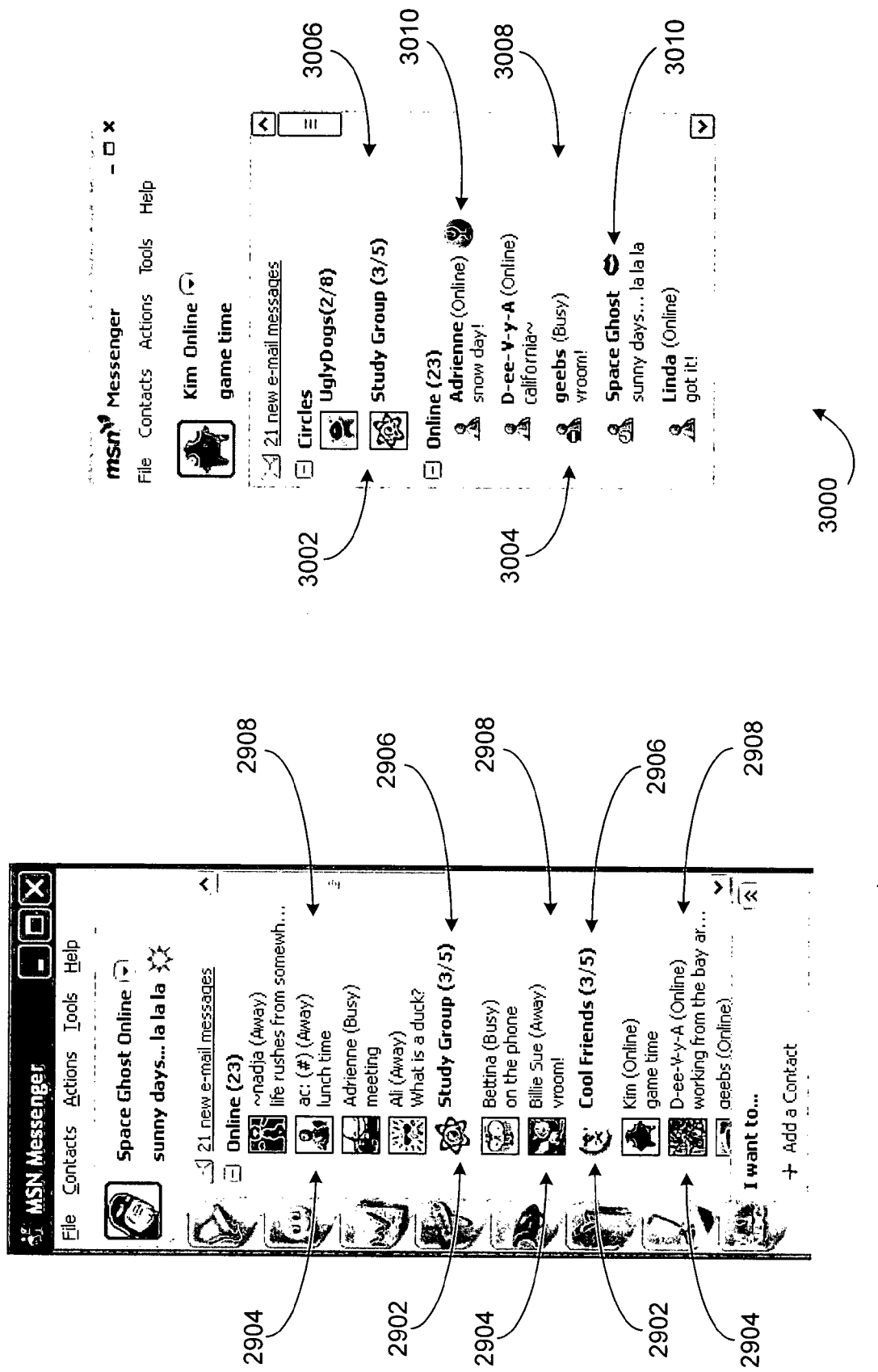

INTERACTIVE ELECTRONIC BUBBLE MESSAGING

FIELD OF THE INVENTION

This invention pertains generally to electronic communication and, more particularly, to computerized messaging.

BACKGROUND OF THE INVENTION

Desktop and laptop personal computers, personal digital assistants and mobile phones: networked computing devices have become part of the way that people communicate. These devices support various modes of communication including synchronous and asynchronous, text, audio and video, telephone calls, instant messaging and electronic mail. Some of the modes of communication are supported by several device types. Some modes are limited to particular device types.

At times, conventional modes of communication supported by networked computing devices can hinder, rather than facilitate, communication between people. Communication is foremost a human activity. Different groups or subcultures may be empowered or restricted by different modes of communication. Modes of communication that are too complex may alienate one group of people. Modes that are too simple may be insufficiently expressive for another group. One group may be frustrated with modes of communication that are unstructured, another with modes that are inflexible.

One group of particular interest in this respect is the group of people familiar with networked computing devices from an early age ("The Net Generation"). This group's familiarity may make some artificialities imposed by networked computing devices transparent, while also making this group particularly sensitive to other artificialities. In addition, the familiarity itself may be a problem. For example, messaging modes of communication that lack sufficient ability for a sender to personalize messages, and thus socially distinguish them from others, may hinder relationship building aspects of communication.

In some modes of communication supported by networked computing devices (e.g., conventional email and instant messaging) there may be an ability for a message recipient to modify and/or duplicate the received message without restriction. Such aspects of modes of communication may socially devalue the received message and thus attenuate its role as, for example, a suitable memento or special keepsake for individuals or groups. In addition, a lack of control over artistic and other works may impoverish modes of communication by making artists and other premium service providers reluctant to contribute to those modes.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, bubble messaging includes creating a bubble message (e.g., a personalized graphical message) and seamlessly sending the bubble message to one or more recipients. The bubble message may include message text and a bubble message shape specification. As a result of the bubble message being sent, a notification of the bubble message may be received. The notification of the bubble message may be displayed and, in response to recipient interaction with the displayed notification, a bubble message open animation may be displayed that provides a transition to a shape specified by the bubble message shape specification. The bubble message may be displayed with the shape specified by the bubble message shape specification.

In an embodiment of the invention, a bubble message editor is configured to enable the creation and seamless sending of the bubble message. In an embodiment of the invention, a bubble message viewer is configured to enable the display of bubble messages. In an embodiment of the invention, the bubble message is unmodifiable after creation.

The bubble message may be specified by a bubble message data structure. The bubble message data structure may include bubble message version data, bubble message identification data, bubble message sender data, bubble message shape data and bubble message body data. The body message shape data may include the bubble message shape specification. The bubble message body data may include the bubble message text.

BRIEF DESCRIPTION OF THE DRAWINGS

While the appended claims set forth the features of the invention with particularity, the invention and its advantages are best understood from the following detailed description taken in conjunction with the accompanying drawings, of which:

FIG. 12 is a data structure diagram depicting example bubble message data in accordance with an embodiment of the invention;

FIG. 16 is a data structure diagram depicting example bubble message animation data in accordance with an embodiment of the invention;

FIG. 17 is a data structure diagram depicting example bubble message feature data in accordance with an embodiment of the invention;

FIG. 29 is a graphical representation of yet another example graphical user interface workspace in accordance with an embodiment of the invention; and FIG. 30 is a graphical representation of still another example graphical user interface workspace in accordance with an embodiment of the invention.

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, wearable devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
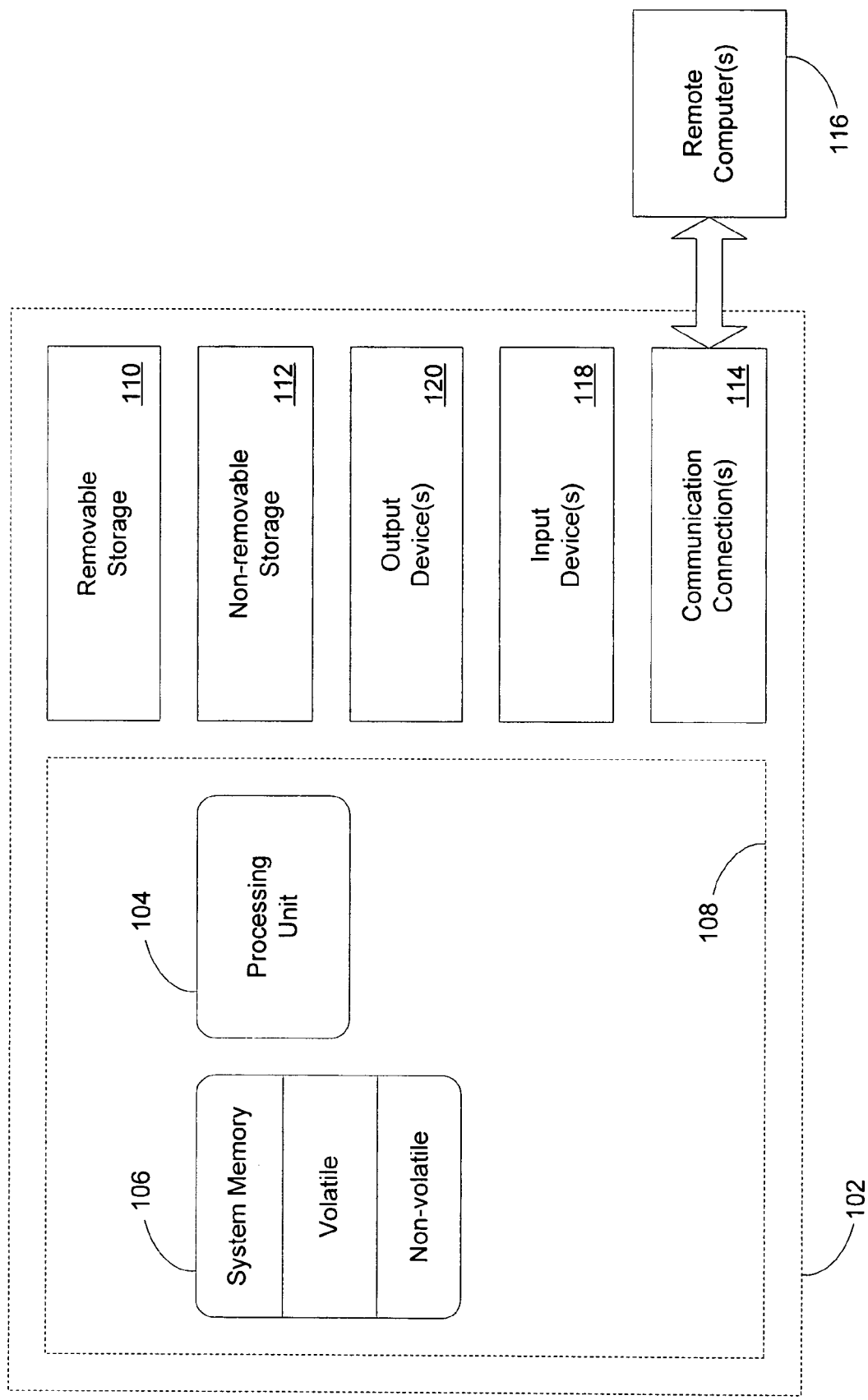
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes computer storage media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

Figure 2:
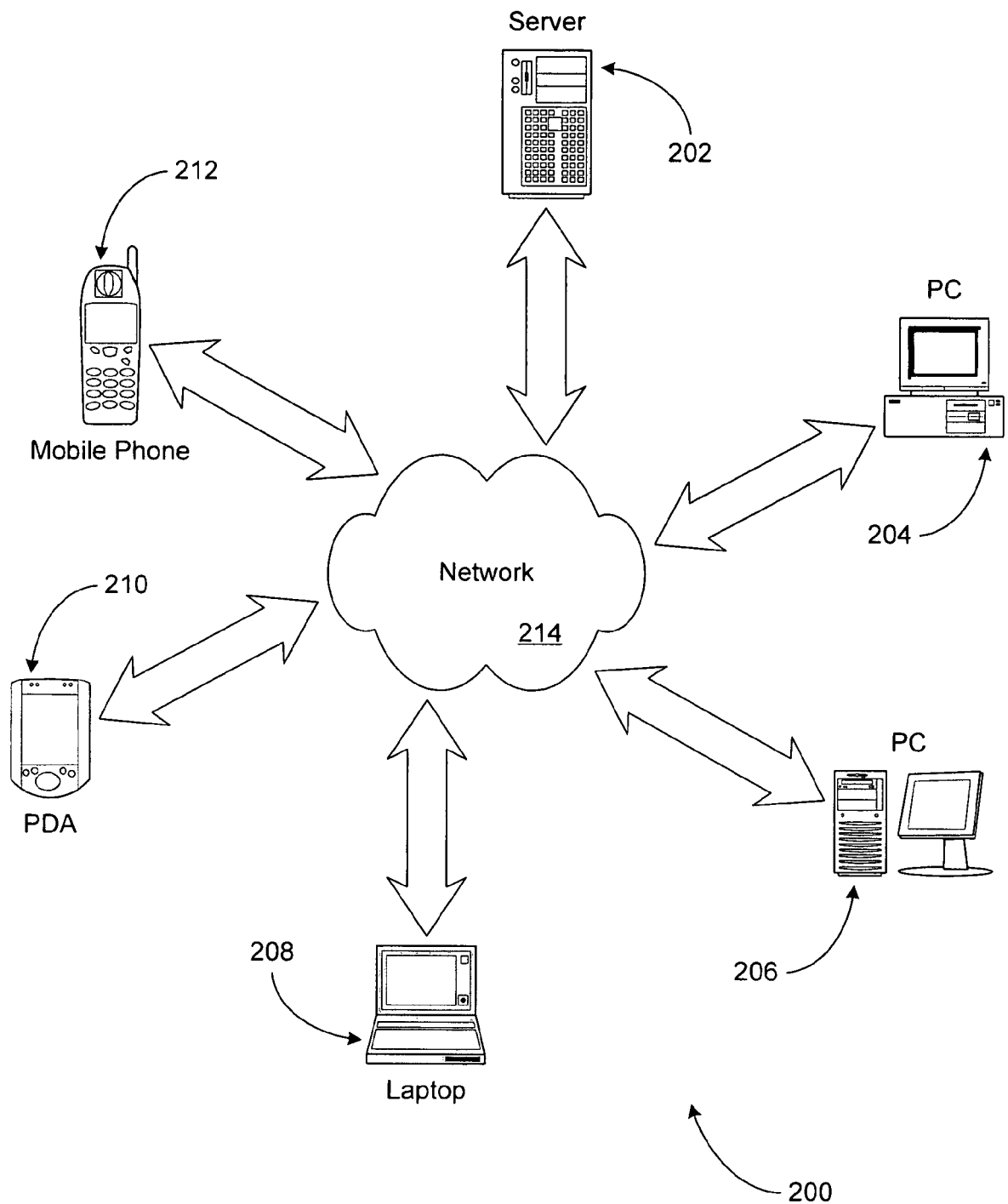
FIG. 2 is a schematic diagram illustrating an example computer networking environment in accordance with an embodiment of the invention.

An example of a computer networking environment suitable for incorporating an embodiment of the invention is described with reference to FIG. 2. The example computer networking environment 200 includes several computing devices 202, 204, 206, 208, 210 and 212 communicating with one another over a computer network 214, represented by a cloud. In the computer networking environment 200, the computing device 202 is a server class computer, the computing devices 204 and 206 are desktop personal computers (PCs), the computing device 208 is a laptop personal computer, the computing device 210 is a personal digital assistant (PDA) and the computing device 212 is a mobile phone. Of course, embodiments of the invention are not limited to the particular computing devices 202, 204, 206, 208, 210 and 212 depicted in FIG. 2. Each of the computing devices 202, 204, 206, 208, 210 and 212 may have features similar to those of the computer 102 described above with reference to FIG. 1. The computing devices 202, 204, 206, 208, 210 and 212 may vary with respect to processing capacity, amount of memory 106, number and type of output devices 120 and so on.

The computer network 214 may include many well-known components, such as switches, routers, gateways, hubs, etc. and allows the computing devices 202, 204, 206, 208, 210 and 212 to communicate via wired and/or wireless media. When interacting with one another over the computer network 214, one or more of the computing devices 202, 204, 206, 208, 210 and 212 may act as clients, servers or peers with respect to other computing devices 202, 204, 206, 208, 210 and 212. Accordingly, the various embodiments of the invention may be practiced on clients, servers, peers or combinations thereof, even though specific examples contained herein may not refer to all of these types of computing devices. In an embodiment of the invention, the computing device 202 acts as a server with respect to the computing devices 204, 206, 208, 210 and 212, which act as clients.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, a person may communicate with another person or with a group of people utilizing a bubble messaging mode of communication. In the bubble messaging mode of communication, a bubble message (e.g., a personalized graphical message) may be created by a computing device user and seamlessly sent to one or more computing device users (e.g., sent from within a bubble message editor). Bubble message creation may be a quick, streamlined process involving minimal personalization. In addition, bubble message creation may involve progressively more elaborate personalization and customization, to a point where the bubble message is considered a gift by sender and receiver. The bubble message may be received soon after being sent (i.e., synchronously) or at some later time (i.e., asynchronously), for example, if the recipient(s) are offline. Where there are multiple recipients, some of the recipients may receive the bubble message synchronously while others receive the bubble message asynchronously. In an embodiment of the invention, the bubble message is not modifiable by the recipient(s).

Figure 3:
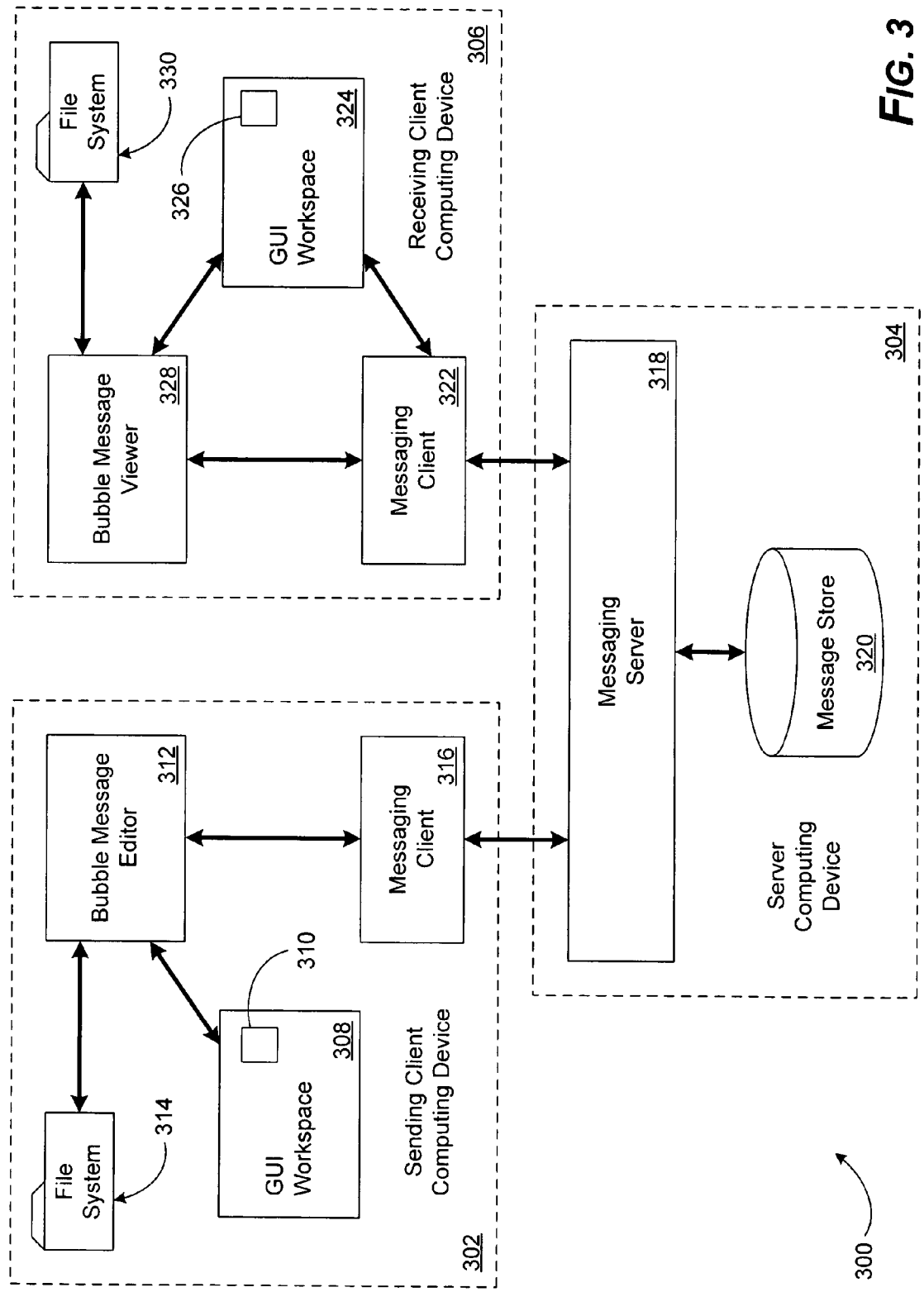
FIG. 3 is a schematic diagram illustrating an example high level system architecture in accordance with an embodiment of the invention.

FIG. 3 illustrates an example high level system architecture 300 in accordance with an embodiment of the invention. The example system architecture 300 includes a sending client computing device 302, a server computing device 304 and a receiving client computing device 306. Each of the sending client computing device 302, the server computing device 304 and the receiving client computing device 306 may be one of the computing devices 202, 204, 206, 208, 210 and 212 of FIG. 2.

The sending client computing device 302 may include a display and graphical user interface (GUI). The graphical user interface may include a workspace 308, for example, the graphical user interface may utilize desktop, window or document visual metaphors. The graphical user interface workspace 308 may be a graphical user interface of a messaging application, for example, a MICROSOFT MSN MESSENGER messaging application. The graphical user interface workspace 308 may include one or more icons 310 visually representing individuals or groups of potential message (e.g., bubble message) senders and/or recipients. The icons 310 need not be in the graphical user interface workspace 308. The icons 310 may be accessed from any suitable conventional graphical user interface component, for example, a graphical user interface menu. Conventional graphical user interface components are known in the art and need not be described here in detail.

A bubble message editor 312 may be invoked by a send bubble message action associated with the icons 310 (e.g., "blow a bubble" or "send a bubble"). The bubble message editor 312 may create (i.e., instantiate, personalize and/or customize) bubble messages and may save them to a file system 314 of the sending client computing device 302 and/or send them to, for example, the receiving client computing device 306 by utilizing a messaging client 316 of the sending client computing device 302. The file system 314 may incorporate a conventional computer file system that manages files in, for example, non-removable storage 112 (FIG. 1), removable storage 110 and/or system memory 108.

The messaging client 316 may be a client for a messaging system capable of transporting messages between networked computing devices 302 and 306. The messaging system may incorporate conventional messaging system components, for example, instant messaging system components and/or electronic mail (e-mail) system components. The messaging system may be dedicated to transporting bubble messages or the messaging system may transport bubble messages along with other types of computer-readable message. Relevant context, details and example application programming interfaces (APIs) for a suitable messaging system are described in the Windows Messenger section of the Microsoft Developer Network (MSDN®) Library.

The messaging client 316 may exchange messages, including bubble messages, with a messaging server 318 of the server computing device 304, for example, over one or more communication connections 114 (FIG. 1). The messaging server 318 may be a server for the messaging system capable of transporting messages between networked computing devices 302 and 306. The messaging server 318 may store bubble messages in a message store 320. The message store 320 may incorporate any suitable conventional database. The messaging server 318 may exchange messages, including bubble messages, with a messaging client 322 of the receiving client computing device 306. The messaging server 318 may store bubble messages intended for a particular recipient, for example, until one or more communication connections 114 (FIG. 1) may be established between the server computing device 304 and the receiving client computing device 306 and/or until the recipient authenticates with the messaging server 318 by utilizing the messaging client 322. The recipient may authenticate with (or register with or login to) the messaging server from any suitable computing device, for example, the computing devices 202, 204, 206, 208, 210 and 212 of FIG. 2.

The recipient may be associated with more than one computing device, for example, the recipient may be associated with the PC 206 and the mobile phone 212. The messaging server 318 may be configured with a multiple computing device delivery policy. For example, the bubble message may be delivered to the PC 206, the mobile phone 212, both the PC 206 and the mobile phone 212 or neither the PC 206 nor the mobile phone 212 depending upon the multiple computing device delivery policy and, for example, computing device attributes that the multiple computing device delivery policy references such as whether the computing device is a mobile computing device and whether the computing device is online.

As with the sending client computing device 302, the receiving client computing device 306 may include a display and graphical user interface. The graphical user interface may have a workspace 324 and the graphical user interface workspace 324 may include one or more icons 326 visually representing individuals or groups of potential message (e.g., bubble message) senders and/or recipients. The messaging client 322 may notify the recipient of the newly dispatched bubble message(s), for example, by displaying one or more new bubble message indicators (i.e., graphical representations of new bubble message notifications) in proximity to one of the icons 326 associated with the sender. Icons 326 that may be associated with the sender include icons representing the sender and icons representing groups that the recipient participates in with the sender. Suitable examples of new bubble message indicators include iconic forms of bubble messages as described in more detail below with reference to FIG. 12.

The recipient may invoke a bubble message viewer 328 to view the newly dispatched bubble message(s), for example, by selecting the new bubble message indicator(s). Some bubble message details such as the sender's name, an icon representing, associated with and/or chosen by the sender, and/or an icon having a same custom color scheme as the bubble message may be viewed by the recipient before invoking the bubble message viewer 328, for example, the messaging client 322 or the new bubble message indicator may display such details to help the recipient differentiate between received bubble messages. An instance of the bubble message viewer 328 may be instantiated for each bubble message to be viewed. Alternatively, the bubble message viewer 328 may be capable of displaying multiple bubble messages. The new bubble message notification(s) may incorporate the dispatched bubble message(s), in which case, the bubble message(s) to be viewed may be passed to the bubble message viewer 328 at invocation. Alternatively, the bubble message viewer 328 may request the messaging client 322 to retrieve the bubble message(s) referenced by the new bubble message notification(s) from the messaging server 318. As well as displaying the bubble message(s), the bubble message viewer 328 may save the bubble message(s) to a file system 330 of the receiving client computing device 306.

Figure 4:
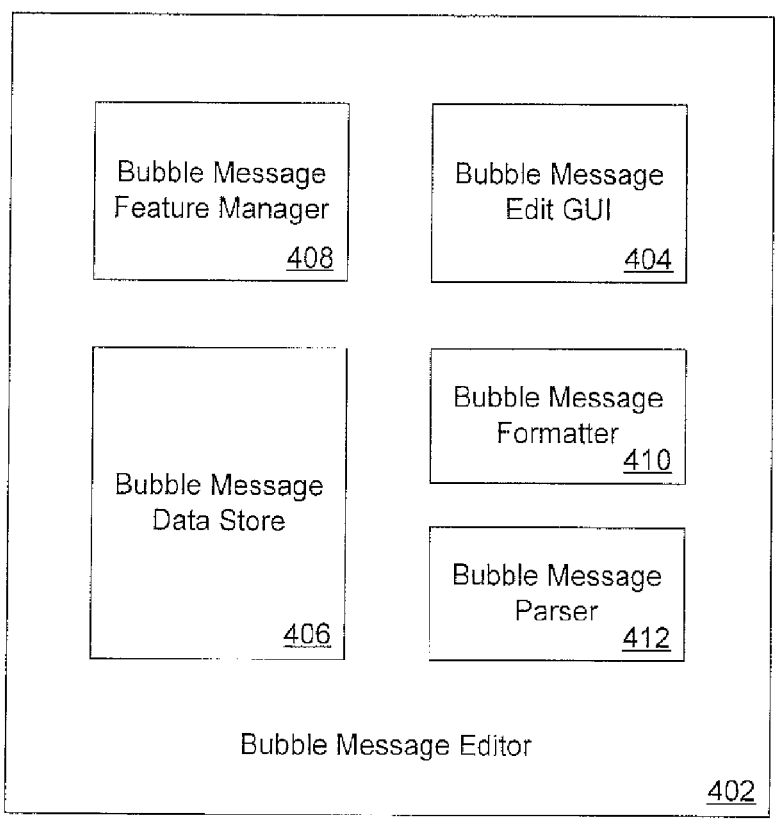
FIG. 4 is a block diagram illustrating an example bubble message editor in accordance with an embodiment of the invention.

It will be helpful to describe the bubble message editor 312 and the bubble message viewer 328 in more detail. FIG. 4 illustrates an example bubble message editor 402 in accordance with an embodiment of the invention. The bubble message editor 402 may play the role of the bubble message editor 312 described above with reference to FIG. 3. The bubble message editor 402 may include a bubble message edit graphical user interface (GUI) 404 component, a bubble message data store 406, a bubble message feature manager 408, a bubble message formatter 410 and a bubble message parser 412.

The bubble message edit graphical user interface 404 component may instantiate and control one or more graphical user interface components for editing bubble messages. An example graphical user interface component for editing bubble messages is described in more detail below with reference to FIG. 5. The bubble message data store 406 may store one or more partially and/or fully instantiated bubble messages as well as bubble message contextual data such as bubble message recipient details. The bubble message edit graphical user interface 404 component may create, read, update and delete bubble messages in the bubble message data store 406. The bubble messages in the bubble message data store 406 may be versions of a single bubble message, for example, to support an editing undo function of the bubble message edit graphical user interface 404 component.

The bubble message feature manager 408 may implement bubble message feature policies, for example, with respect to bubble message feature subscriptions, bubble message feature versioning, bubble message modification and/or bubble message distribution. For example, the bubble message feature manager 408 may inhibit the bubble message edit graphical user interface 404 component from adding features that require subscriptions to bubble messages without a valid subscription, or from editing a bubble message instance that has been marked unmodifiable. The bubble message feature manager 408 may actively implement bubble message feature policies or passively implement bubble message feature policies, for example, by providing policy information or policy decisions upon request.

The bubble message formatter 410 may format data from the bubble message data store 406 into formats suitable for saving to the file system 314 (FIG. 3) and/or suitable for passing to the messaging client 316 for network transport, for example, extensible markup language (XML) format. The bubble message parser 412 may parse bubble message data, for example, from the file system 314 and/or the messaging client 316, and store the parsed bubble message data in the bubble message data store 406. The bubble message parser 412 may inhibit (or be inhibited from) parsing of bubble messages marked unmodifiable. In an embodiment of the invention, the bubble message editor 402 is independent of a bubble message parser such as the bubble message parser 412.

Figure 5:
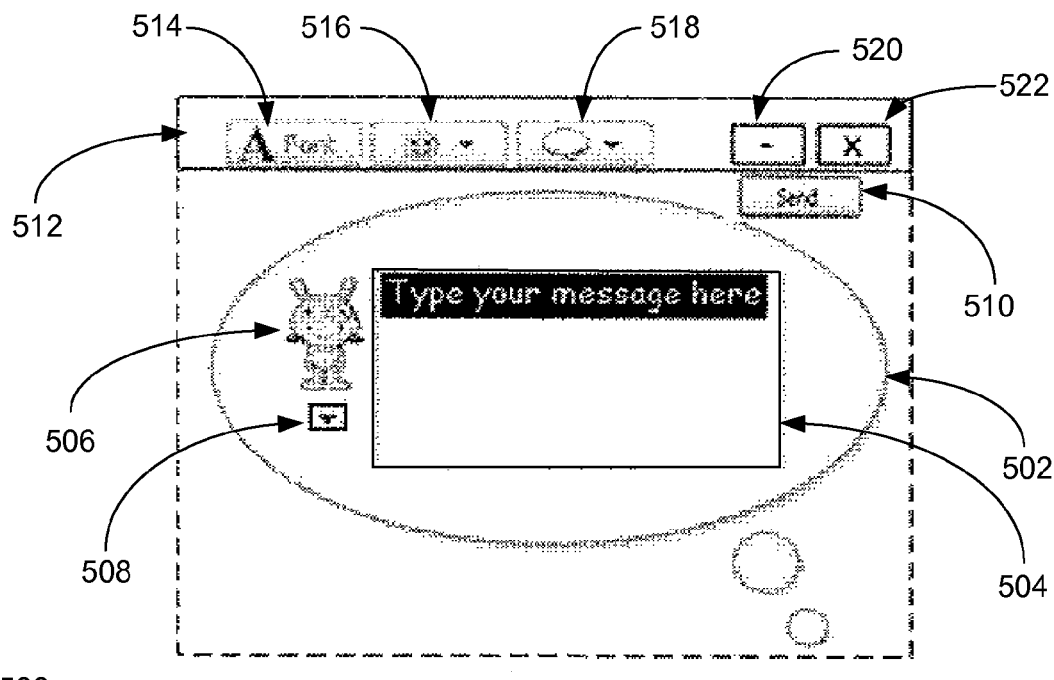
FIG. 5 is a graphical representation of an example user interface for editing bubble messages in accordance with an embodiment of the invention.

Each networked computing device 202, 204, 206, 208, 210 and 212 (FIG. 2) may have a graphical user interface component for editing bubble messages. FIG. 5 illustrates an example graphical user interface component 500 for editing bubble messages in accordance with an embodiment of the invention. The graphical user interface component 500 for editing bubble messages may include a bubble message shape 502, a text edit area 504, a sender icon 506, a sender icon chooser button 508, a send button 510 and a bubble message edit menu bar 512. The bubble message edit menu bar 512 may include a font button 514, an emoticon button 516, a bubble message shape button 518, a minimize button 520 and a close button 522.

The networked computing device user editing the bubble message with graphical user interface 500 may edit bubble message text within the text edit area 504. Text font, text color, text size and text special effects such as justification, bold and underlining may be selected with a conventional text effects chooser displayed by selecting the font button 514.

Text sequences indicative of emoticons (e.g., ":-)") may be dynamically replaced inline with an iconic form of the indicated emoticon. Emoticons may also be inserted into the bubble message text with an emoticon chooser displayed by selecting the emoticon button 516. Text sequences referencing network resources (e.g., "http://www.microsoft.com/") may be dynamically replaced inline with active hyperlinks. The bubble message shape 502 may automatically resize to accommodate text in the text edit area 504. The bubble message shape 502 may be automatically inhibited from being resized smaller than the text in the text edit area 504.

The sender icon 506 may be an image representing, associated with and/or chosen by the sender of the bubble message, an instant messaging "buddy tile," an "electronic sticker", an animated image or the like. Selecting the sender icon chooser button 508 may display a sender icon chooser suitable for choosing a sender icon to include in the bubble message. An example bubble message sender icon chooser is described in more detail below with reference to FIG. 27. The sender icon chooser (and like choosers) may include image special effects to be applied to the chosen sender icon such as glow, negative image and drop shadow effects. In an embodiment of the invention, the bubble message may include a plurality of electronic stickers, and the bubble message edit menu bar 512 may include a button for displaying an electronic sticker chooser.

Selecting the bubble message shape button 518 may display a bubble message shape chooser suitable for choosing the bubble message shape 502. An example bubble message shape chooser is described in more detail below with reference to FIG. 6. Selecting the minimize button 520 may have a conventional effect, for example, temporarily suspending bubble message editing and placing the graphical user interface component 500 for editing bubble messages in an iconic form. Selecting the close button 520 may have a conventional effect, for example, closing the graphical user interface component 500. Selecting the send button 510 may send the newly created bubble message to its intended recipients.

Figure 26:
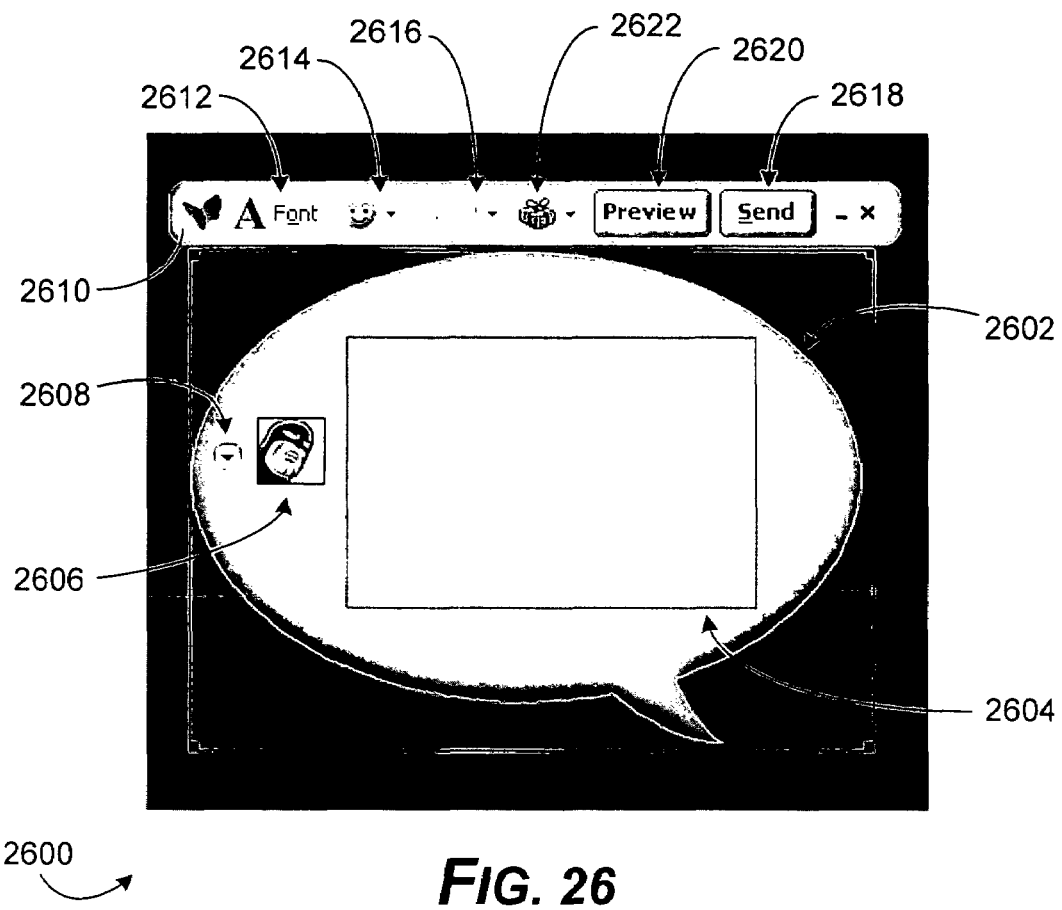
FIG. 26 is a graphical representation of another example user interface for editing bubble messages in accordance with an embodiment of the invention.

FIG. 26 illustrates another example graphical user interface component 2600 for editing bubble messages in accordance with an embodiment of the invention. The graphical user interface component 2600 for editing bubble messages may include several similar sub-components with similar function as described above with reference to FIG. 5. For example, a bubble message shape 2602, a text edit area 2604, a sender icon 2606, a sender icon chooser button 2608, and a bubble message edit menu bar 2610, a font button 2612, an emoticon button 2614, and a bubble message shape button 2616 may correspond respectively to the bubble message shape 502, the text edit area 504, the sender icon 506, the sender icon chooser button 508, the bubble message edit menu bar 512, the font button 514, the emoticon button 516 and the bubble message shape button 518 of the graphical user interface component 500 for editing bubble messages.

A send button 2618 on the bubble message edit menu bar 2610 may correspond to the send button 510. In addition, the bubble message edit menu bar 2610 may further include a preview button 2620 and an attach object button 2622. Selecting the preview button 2620 may display the bubble message being edited as it would appear to a recipient. Selecting the attach object button 2622 may display an object selection dialog for selecting an object to attach to (or embed in) bubble messages. Examples of objects suitable for attaching to bubble messages include gift objects such as electronic cash, reward points, and items or references to items purchased from an online vendor, for example, audio files containing music, video files, electronic books, and purchase authentication information for ordered physical books, clothing and the like. Further examples of objects suitable for attaching to bubble messages include documents (e.g., XML documents) that reference and/or offer such gifts and gift objects.

Figure 6:
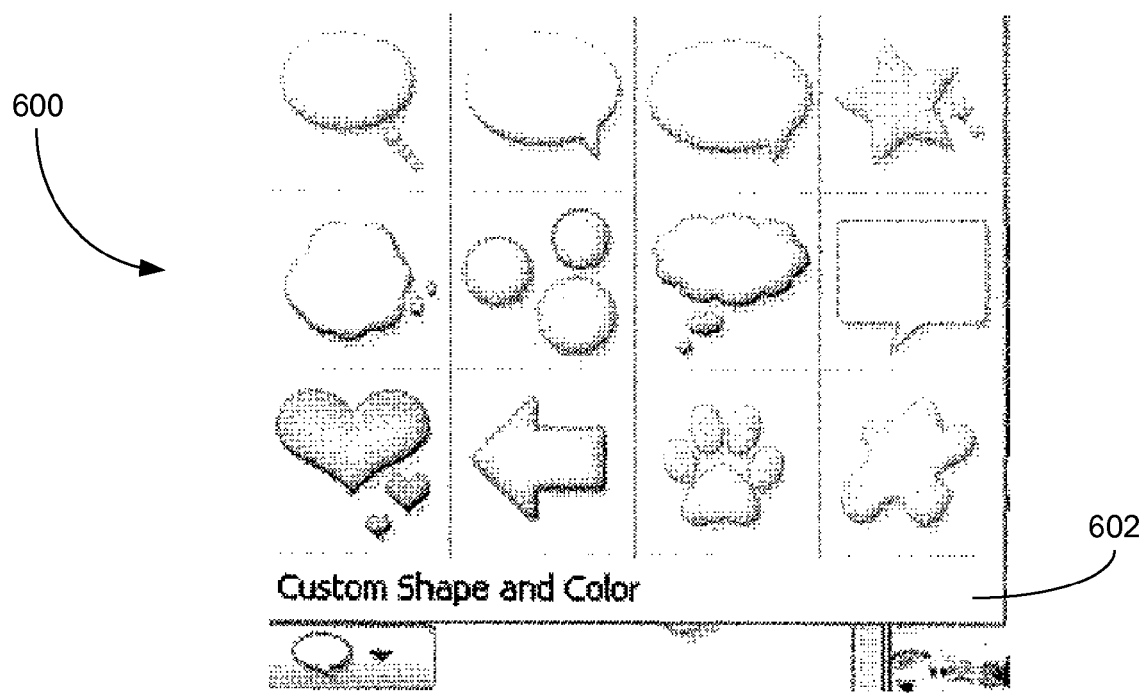
FIG. 6 is a graphical representation of an example user interface for choosing bubble message shapes in accordance with an embodiment of the invention.

FIG. 6 illustrates an example bubble message shape chooser 600 in accordance with an embodiment of the invention. The bubble message shape chooser 600 may include multiple rows and columns of icons representing bubble message shapes. More frequently chosen bubble message shapes may be located closer to the top left corner of the bubble message shape chooser 600 or equivalent location in accordance with cultural practice. The bubble message shape chooser 600 may further include a bubble message custom shape and color chooser button 602. Selecting the bubble message custom shape and color chooser button 602 may display a bubble message custom shape and color chooser.

Figure 7:
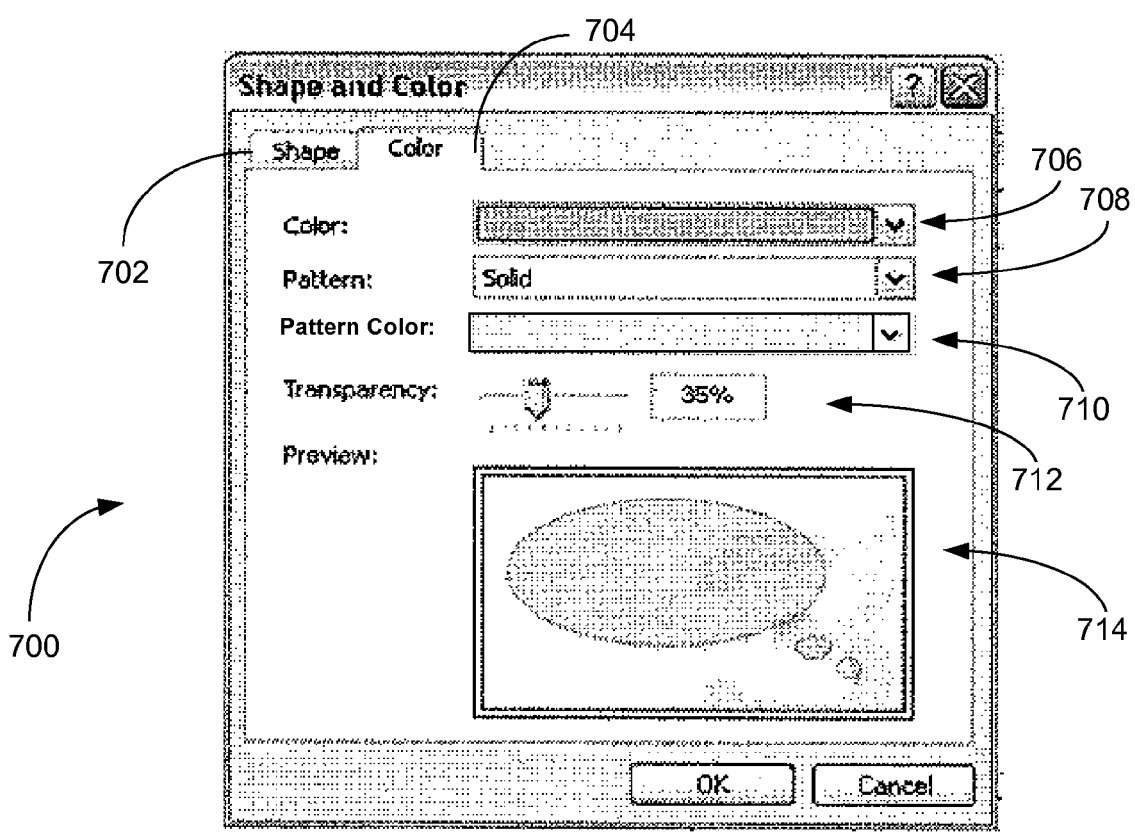
FIG. 7 is a graphical representation of an example user interface for creating custom bubble message shapes in accordance with an embodiment of the invention.

FIG. 7 illustrates an example bubble message custom shape and color chooser 700 in accordance with an embodiment of the invention. The bubble message custom shape and color chooser 700 includes a custom shape tab 702 and a custom color tab 704. The custom shape tab 702 (not shown in FIG. 7) may enable modification of bubble message template shapes, for example, one of the bubble message shapes represented by the icons of the bubble message shape chooser 600 (FIG. 6). The custom shape tab 702 may also enable creation of a new bubble message shape template from freehand and guided lines, curves, circles, polygons, image effects and the like. New and modified bubble message shape templates may be saved to the file system 314 (FIG. 3) and may appear in the bubble message shape chooser 600.

The custom color tab 704 may include a bubble message shape color chooser 706, a bubble message shape background pattern chooser 708, a bubble message shape background pattern color chooser 710, a bubble message shape background transparency chooser 712 and a bubble message shape preview panel 714. The bubble message shape color chooser 706 may enable selection of a personalized color or color scheme for the bubble message shape. The bubble message shape background pattern chooser 708 may enable selection of a personalized background pattern for the bubble message shape, for example, a striping, an image tiling, a color gradient or shading. The bubble message shape background pattern color chooser 710 may enable selection of a personalized color or color scheme for the bubble message shape background pattern. The bubble message shape background transparency chooser 712 may enable selection of a personalized level of background transparency, for example, relative to text and graphics in a foreground of the bubble message. The bubble message shape preview panel 714 may display a preview of a custom bubble message shape resulting from the combined effects of the current bubble message custom shape and color chooser 700 settings.

Figure 27:
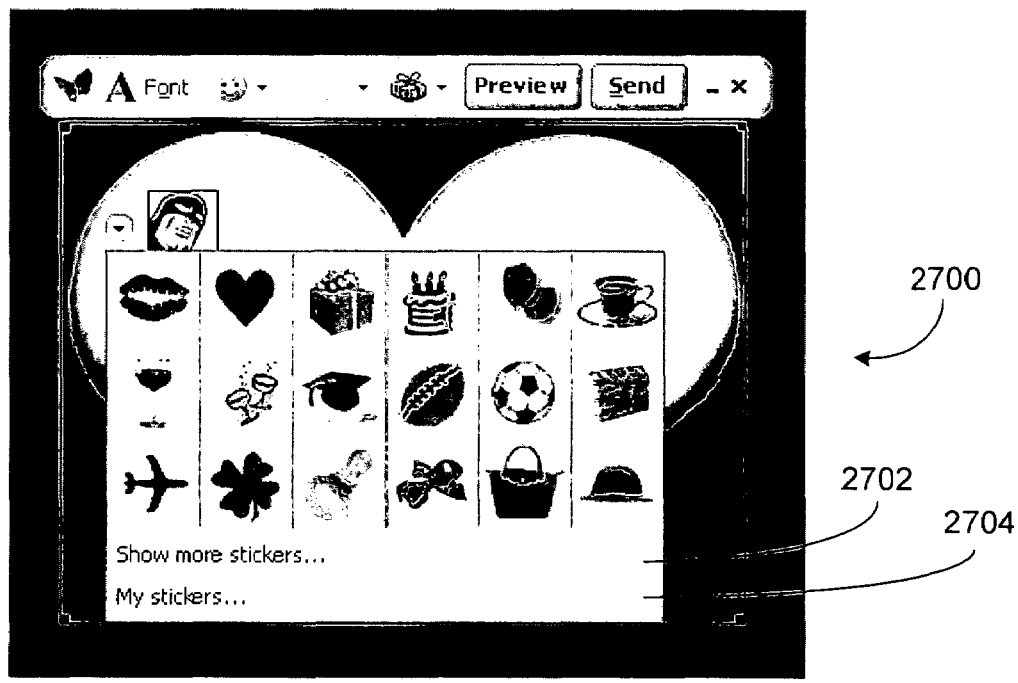
FIG. 27 is a graphical representation of an example user interface for choosing bubble message sender icons in accordance with an embodiment of the invention.

FIG. 27 illustrates an example bubble message sender icon chooser 2700 in accordance with an embodiment of the invention. The bubble message sender icon chooser 2700 may include multiple rows and columns of sender icons (including electronic stickers). More frequently chosen sender icons may be located closer to the top left corner of the bubble message sender icon chooser 2700 or equivalent location in accordance with cultural practice. The bubble message sender icon chooser 2700 may further include a show more stickers button 2702 and a my stickers button 2704. Selecting the show more stickers button 2702 may change the sender icons displayed in the rows and columns of the bubble message sender icon chooser 2700. Selecting the my stickers button 2704 may display a predefined group of sender icons, for example, sender icons that have been previously selected.

Figure 8:
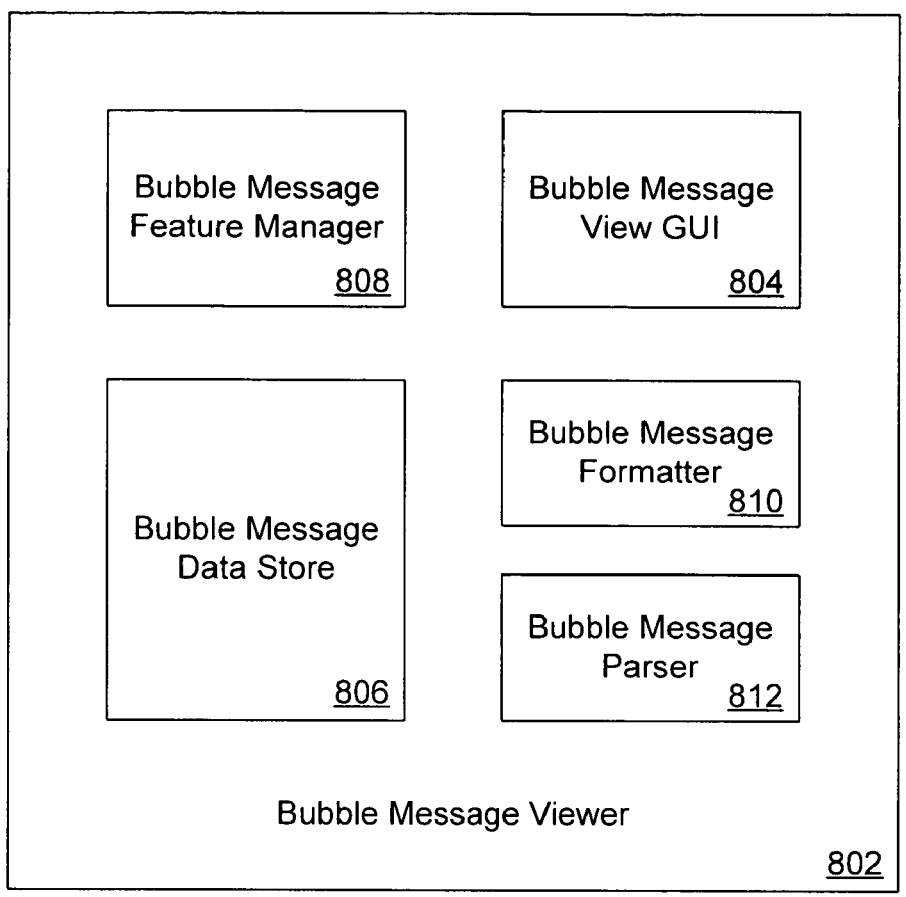
FIG. 8 is a block diagram illustrating an example bubble message viewer in accordance with an embodiment of the invention.

FIG. 8 illustrates an example bubble message viewer 802 in accordance with an embodiment of the invention. The bubble message viewer 802 may play the role of the bubble message viewer 328 described above with reference to FIG. 3. The bubble message viewer 802 may also be utilized to preview bubble messages prior to the bubble messages being sent to their intended recipients. The bubble message viewer 802 may include a bubble message view graphical user interface (GUI) 804 component, a bubble message data store 806, a bubble message feature manager 808, a bubble message formatter 810 and a bubble message parser 812.

The bubble message view graphical user interface 804 component may instantiate and control one or more graphical user interface components for viewing bubble messages. An example graphical user interface component for viewing bubble messages is described in more detail below with reference to FIG. 9. The bubble message data store 806 may store one or more received or newly created bubble messages as well as bubble message contextual data such as whether or not a particular bubble message has been previously viewed. The bubble message view graphical user interface 804 component may read and delete bubble messages in the bubble message data store 806. In an embodiment of the invention, bubble messages in the bubble message data store 806 may not be modified.

As for the bubble message editor 402 (FIG. 4), the bubble message feature manager 808 may actively or passively implement bubble message feature policies. The bubble message formatter 810 may format data from the bubble message data store 806 into formats suitable for saving to the file system 330 (FIG. 3), for example, extensible markup language format. The bubble message parser 812 may parse bubble message data, for example, from the file system 330 and/or the messaging client 322, and store the parsed bubble message data in the bubble message data store 806. The bubble message formatter 810 may inhibit (or be inhibited from) formatting of bubble messages marked unmodifiable. In an embodiment of the invention, the bubble message viewer 802 is independent of a bubble message formatter such as the bubble message formatter 810.

Figure 9:
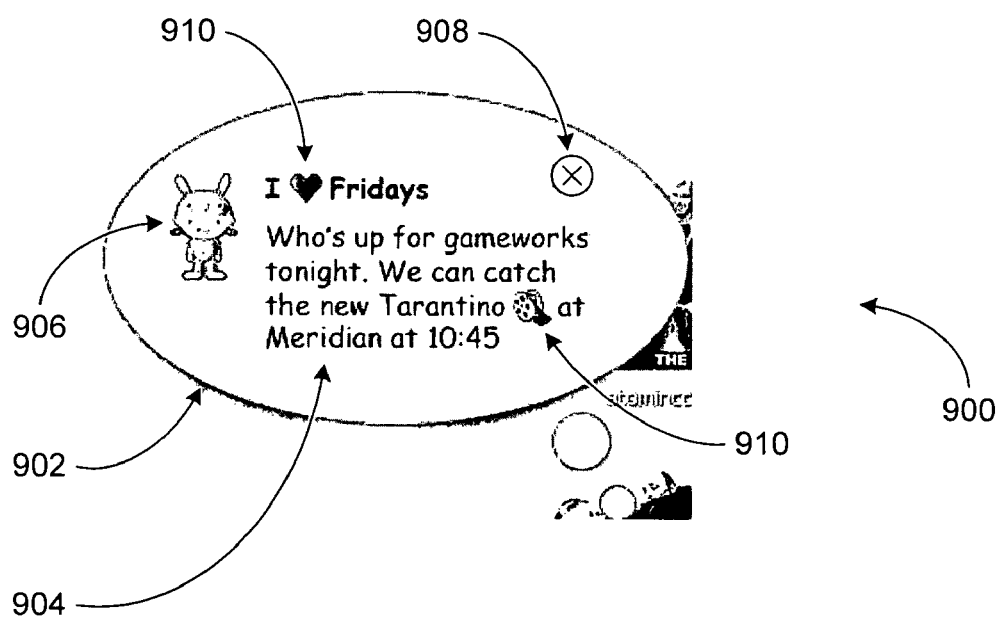
FIG. 9 is a graphical representation of an example user interface for viewing bubble messages in accordance with an embodiment of the invention.

Each networked computing device 202, 204, 206, 208, 210 and 212 (FIG. 2) may have one or more graphical user interface components for viewing bubble messages. FIG. 9 illustrates an example graphical user interface component 900 for viewing bubble messages in accordance with an embodiment of the invention. The graphical user interface component 900 for viewing bubble messages may include a bubble message shape 902, bubble message text 904, a sender icon 906 and a close button 908. In this example, the bubble message text 904 includes emoticons 910.

The bubble message shape 902, the bubble message text 904 and the sender icon 906 may be a shape, text and icon specified by associated bubble message data stored in the bubble message data store 806 (FIG. 8). The graphical user interface component 900 may display additional graphical objects specified by the associated bubble message data (e.g., electronic stickers). The graphical user interface component 900 may be capable of displaying any suitable text specification, for example, a rich text specification as described by the Rich Text Format (RTF) Specification, version 1.6, May 1999, of the Microsoft® Developer Network (MSDN®) Library.

Before displaying the bubble message as illustrated in FIG. 9, the graphical user interface component 900 (or other suitable graphical user interface component) may display a bubble message open animation, for example, as specified by the associated bubble message data. The bubble message open animation may be an inflation of the bubble message shape 902 from an iconic form (i.e., "blowing the bubble"), an unwrapping of a gift, an unfolding of the bubble message shape 902, or any suitable transitioning animation. Similarly, after displaying the bubble message as illustrated in FIG. 9 (e.g., in response to selection of the close button 908), the graphical user interface component 900 (or other suitable graphical user interface component) may display a bubble message close animation. The bubble message close animation may also be specified by the associated bubble message data. The bubble message close animation may be a deflation of the bubble message shape 902 to an iconic form, a wrapping of the gift (i.e., of the bubble message), a folding of the bubble message shape 902, or any suitable transitioning animation. The bubble message shape 902 may itself be animated. The bubble message open animation and the bubble message close animation may be integral to the bubble message shape 902.

Figure 28:
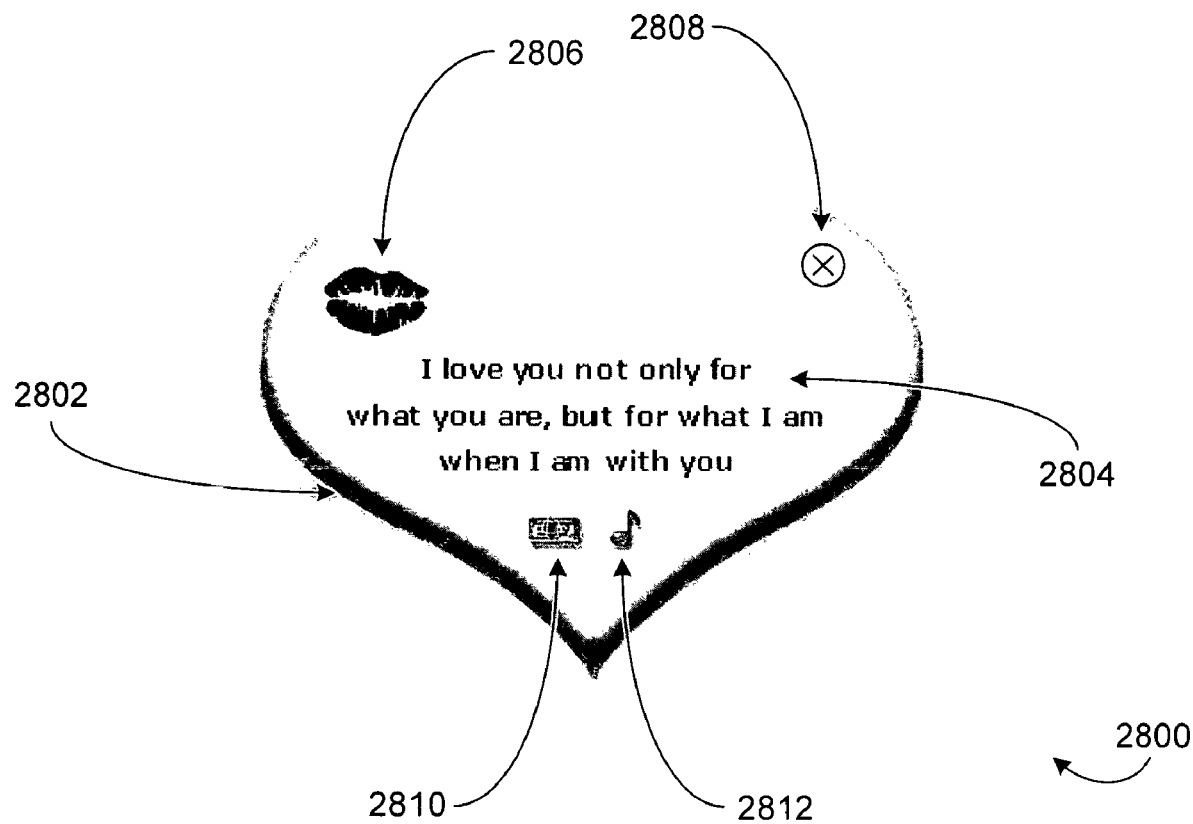
FIG. 28 is a graphical representation of another example user interface for viewing bubble messages in accordance with an embodiment of the invention.

FIG. 28 illustrates another example graphical user interface component 2800 for viewing bubble messages in accordance with an embodiment of the invention. The graphical user interface component 2800 for viewing bubble messages may include several similar sub-components with similar function as described above with reference to FIG. 9. For example, a bubble message shape 2802, a bubble message text 2804, a sender icon 2806 and a close button 2808 may correspond respectively to the bubble message shape 902, the bubble message text 904, the sender icon 906 and the close button 908 of the graphical user interface component 900 for viewing bubble messages. In addition, the graphical user interface component 2800 for viewing bubble messages may include one or more icons 2810 and 2812 representing attached objects such as gift objects. For example, the icon 2810 may represent attached electronic cash and the icon 2812 may represent an attached audio file containing music.

Figure 10:
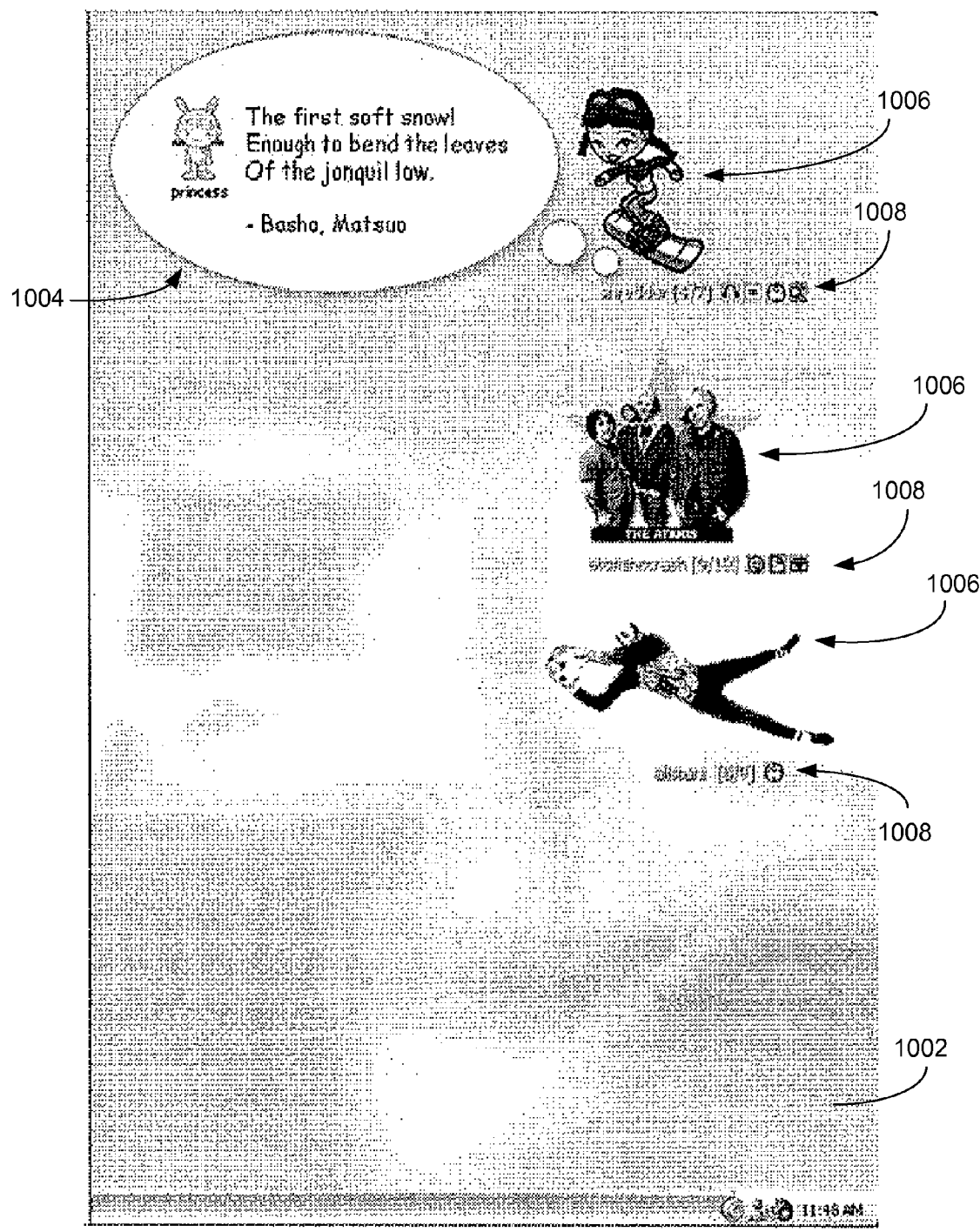
FIG. 10 is a graphical representation of an example graphical user interface workspace in accordance with an embodiment of the invention.

FIG. 10 illustrates an example graphical user interface workspace 1002 over which an example graphical user interface component 1004 for viewing bubble messages is displayed in accordance with an embodiment of the invention. Also on the graphical user interface workspace 1002 are icons 1006 visually representing groups of potential message (e.g., bubble message) senders and/or recipients. Beneath each of the icons 1006 are group status indicators 1008 indicating current group properties such as group name, number of people in the group, number of people in the group who are online, current group activities and the like. In an embodiment of the invention, new bubble message indicators or, for example, a new bubble message notification counter, may appear inline with the group status indicators 1008 of the group from which the associated bubble message originated.

Figure 11:
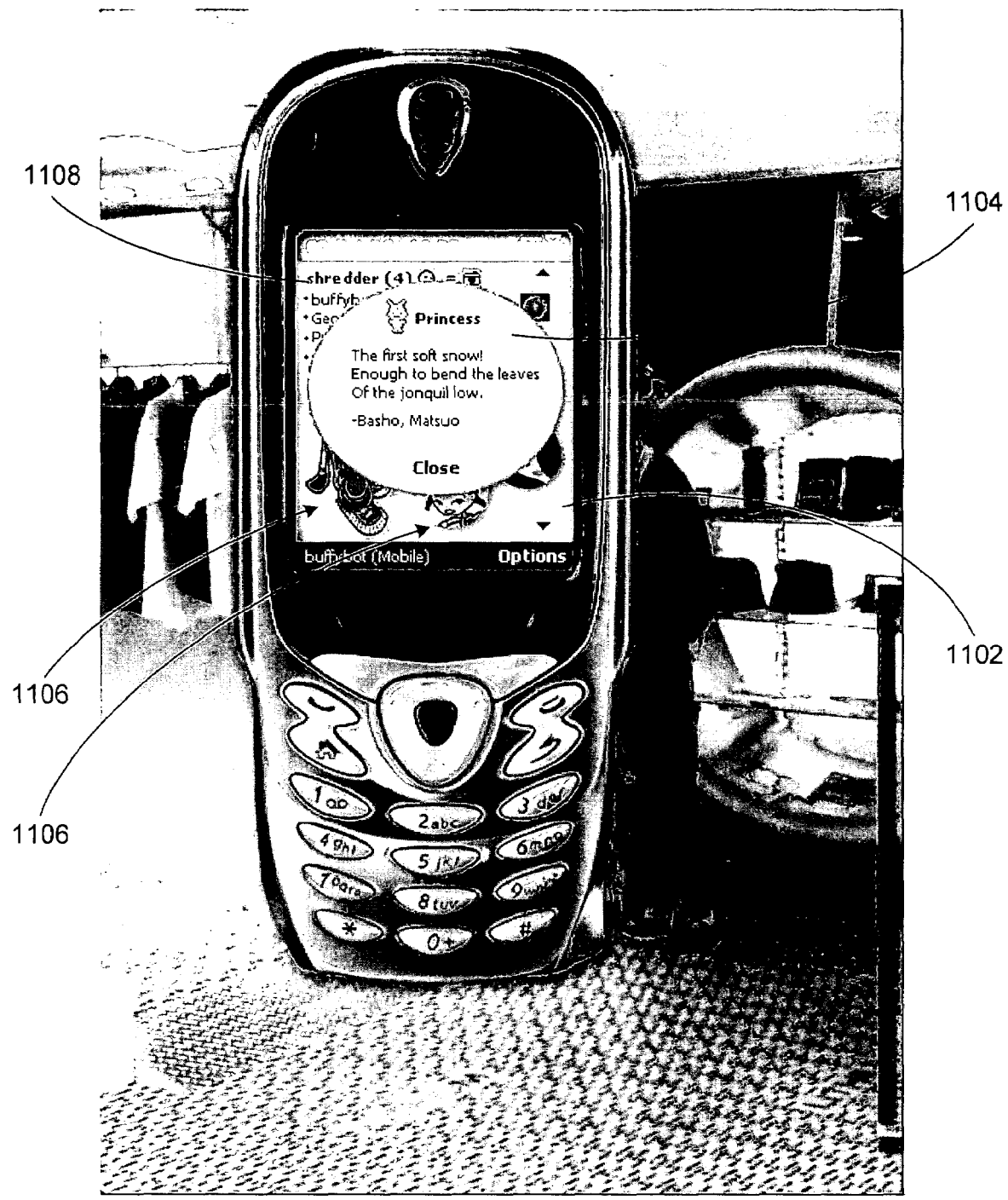
FIG. 11 is a graphical representation of another example graphical user interface workspace in accordance with an embodiment of the invention.

FIG. 11 illustrates another example graphical user interface workspace 1102 over which another example graphical user interface component 1104 for viewing bubble messages is displayed in accordance with an embodiment of the invention. The graphical user interface workspace 1102 and the graphical user interface component 1104 for viewing bubble messages may be particularly suited to display by a mobile computing device such as the mobile phone 212 of FIG. 2. In this example, the graphical user interface component 1104 for viewing bubble messages is displaying the same bubble message as is being displayed by the graphical user interface component 1004 for viewing bubble messages in FIG. 10. Although the bubble message is not displayed identically in FIG. 10 and FIG. 11, graphical user interface components for viewing bubble messages may aim for identical presentation of a particular bubble message within the constraints of the computing devices 202, 204, 206, 208, 210, 212 (FIG. 2) on which the graphical user interface components for viewing bubble messages reside, for example, the constraints of the output devices 120 (FIG. 1). Icons 1106 visually representing groups of potential message (e.g., bubble message) senders and/or recipients may be seen beneath the graphical user interface component 1104. A group status indicator 1108 for a selected group is also shown in FIG. 11.

FIG. 29 illustrates yet another example graphical user interface workspace 2900 in accordance with an embodiment of the invention. The graphical user interface workspace 2900 may include icons 2902 associated with groups of potential message (e.g., bubble message) senders and/or recipients, as well as icons 2904 associated with individual group members. Icons 2904 associated with individuals may be the sender icon 506 (FIG. 5) or a default sender icon included in bubble messages sent by the individual. Group status indicators 2906 may be located beside each group. Individual group members may each have individual status indicators 2908.

FIG. 30 illustrates still another example graphical user interface workspace 3000 in accordance with an embodiment of the invention. The graphical user interface workspace 3000 may include icons 3002 associated with groups of potential message (e.g., bubble message) senders and/or recipients, as well as icons 3004 associated with individuals. As for the graphical user interface workspace 2900 described above with reference to FIG. 29, group status indicators 3006 may be located beside each group and individual group members may each have individual status indicators 3008. The icons 3004 associated with individuals may further indicator individual status. Individual status indicators 3008 may include new bubble message indicators 3010. The new bubble message indicators 3010 may be the icon representing, associated with and/or chosen by the sender, and/or the icon having the same custom color scheme as the associated bubble messages.

Before describing detailed procedures performed in accordance with an embodiment of the invention, it will be helpful to describe bubble message data in more detail. FIG. 12 depicts example bubble message data in accordance with an embodiment of the invention. Bubble message data 1202 may include bubble message version data 1204, bubble message identification data 1206, bubble message sender data 1208, bubble message iconic shape data 1210, bubble message shape data 1212, bubble message body data 1214, bubble message animation data 1216, bubble message feature data 1218, bubble message feature unlock data 1220 and bubble message customization data 1222. Bubble messages may be specified by bubble message data 1202.

The example bubble message data 1202 is arranged according to a particular bubble message data schema, for example, a data schema such as may be specified with an extensible markup language (XML) schema, a relational database schema, an object oriented database schema or the like. The bubble message data schema may change over time, for example, to accommodate additional features and functionality. To aid adaptation to changing bubble message data schema, each bubble message data schema may be associated with a bubble message version specification. The bubble message version data 1204 may include the bubble message version specification for the bubble message data schema associated with the bubble message data 1202.

The bubble message identification data 1206 may uniquely identify a particular bubble message instance associated with the bubble message data 1202. The bubble message identification data 1206 is described in more detail below with reference to FIG. 13. The bubble message sender data 1208 may include data referencing, representing and/or associated with the bubble message originator. The bubble message sender data 1208 is described in more detail below with reference to FIG. 14.

The bubble message iconic shape data 1210 may include data for representing the bubble message in iconic form (i.e., a bubble message iconic shape specification), for example, one or more images, image modifiers such as special effects, image animations, sound effects and/or soundtracks. Examples of iconic forms of bubble messages include simple icons, electronic stickers, sender icons, deflated bubble messages, wrapped gifts, folded bubble messages and animated versions thereof. The bubble message shape data 1212 may include a bubble message shape specification, for example, as specified by the bubble message editor 312 (FIG. 3). The bubble message shape data 1212 is described in more detail below with reference to FIG. 15.

The bubble message body data 1214 may specify bubble message foreground content such as bubble message text (e.g., the bubble message text 904 of FIG. 9) and electronic stickers. The bubble message animation data 1216 may specify one or more animations associated with the bubble message. The bubble message animation data 1216 is described in more detail below with reference to FIG. 16. The bubble message feature data 1218 may include one or more bubble message feature specifications and/or one or more bubble message feature configurations. The bubble message feature data 1218 is described below in more detail with reference to FIG. 17.

Some bubble message features may be lockable, that is, inaccessible or unavailable without valid authentication and/or authorization. The bubble message feature unlock data 1220 may include one or more bubble message feature unlock keys, for example, suitable cryptographic keys and/or cryptographically signed authentication data. Bubble message feature unlock keys may be restricted, for example, be valid for a particular time period or for a particular set of network addresses, and may serve to validate bubble message feature subscriptions. The bubble message customization data 1222 may include data utilized to customize the bubble message, for example, custom bubble message shape specifications, custom electronic stickers, custom emoticons and custom sender icons.

Figure 13:
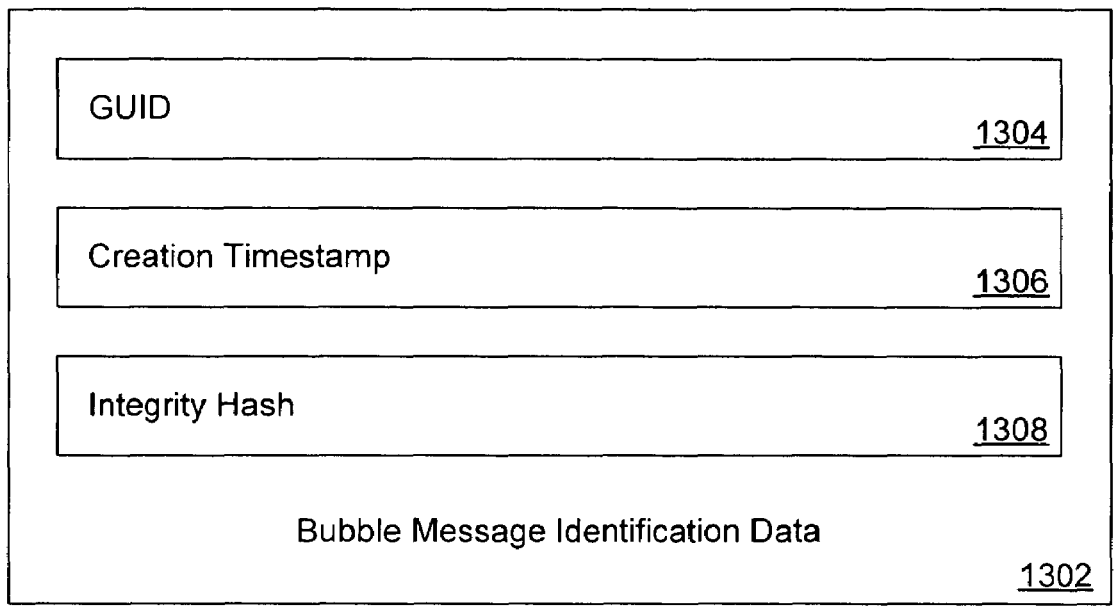
FIG. 13 is a data structure diagram depicting example bubble message identification data in accordance with an embodiment of the invention.

FIG. 13 depicts example bubble message identification data in accordance with an embodiment of the invention. Bubble message identification data 1302 is a suitable example of the bubble message identification data 1206 (FIG. 12) incorporated in the bubble message data 1202. The bubble message identification data 1302 may include a globally unique identifier (GUID) 1304, a creation timestamp 1306 and an integrity hash 1308.

The globally unique identifier 1304 may be a conventional globally unique identifier (GUID) assigned to the newly created bubble message at creation time. The creation timestamp 1306 may include a date and time of creation of the bubble message. The integrity hash 1308 may be a cryptographic hash (e.g., an MD5 message digest) of the bubble message data 1202 (FIG. 12), for example, determined once bubble message editing is complete. As will be apparent to one of skill in the art, the integrity hash 1308 may be utilized to detect unauthorized modifications of the bubble message data 1202 and thus, for example, to support enforcement of bubble message feature policies inhibiting modification of bubble messages marked as unmodifiable.

Figure 14:
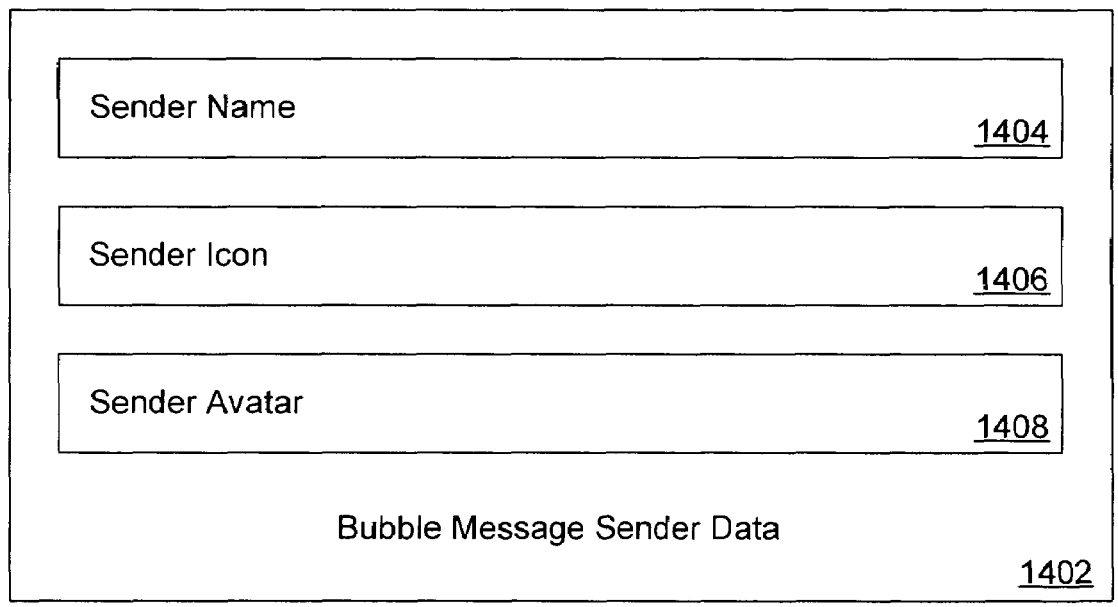
FIG. 14 is a data structure diagram depicting example bubble message sender data in accordance with an embodiment of the invention.

FIG. 14 depicts example bubble message sender data in accordance with an embodiment of the invention. Bubble message sender data 1402 is a suitable example of the bubble message sender data 1208 (FIG. 12) incorporated in the bubble message data 1202. The bubble message sender data 1402 may include a sender name 1404, a sender icon 1406 and a sender avatar 1408. The bubble message associated with the bubble message sender data 1402 may be created and/or sent (i.e., originated) by a user of one of the networked computing devices 202, 204, 206, 208, 210, 212 (FIG. 2). The sender name 1404 may be a friendly (e.g., human-readable) name of the bubble message originator, for example, a string of alphanumeric characters. The sender icon 1406 may be an image or a reference to an image associated with the bubble message originator such as the sender icon 506 (FIG. 5).

Beyond the sender icon 1406, the bubble message originator may be associated with one or more audio-visual avatars. For example, audio-visual avatars may include animated images and associated soundtracks representing the bubble message originator. Audio-visual avatars need not be strictly representational of the bubble message originator, for example, associated images and sounds may be fantastic or abstract in character. Audio-visual avatars may further include programmed behaviors that occur in response to computing device events such as computing device user input. The sender avatar 1408 field of the bubble message sender data 1402 may store or reference one or more audio-visual avatars associated with the bubble message originator. For example, the sender avatar 1408 may reference a custom audio-visual avatar in the bubble message customization data 1222 (FIG. 12).

Figure 15:
FIG. 15 is a data structure diagram depicting example bubble message shape data in accordance with an embodiment of the invention.

FIG. 15 depicts example bubble message shape data in accordance with an embodiment of the invention. Bubble message shape data 1502 is a suitable example of the bubble message shape data 1212 (FIG. 12) incorporated in the bubble message data 1202. The bubble message shape data 1502 may include a shape identifier 1504, shape dimensions 1506, a shape color 1508, a shape background 1510, a shape animation 1512 and a shape soundtrack 1514.

There may be a set of standard bubble message shapes known to (i.e., stored or referenced by) the bubble message editor 312 (FIG. 3) and the bubble message viewer 328. The shape identifier 1504 may identify one of the set of standard bubble message shapes or, for example, reference one of the custom bubble message shape specifications stored in the bubble message customization data 1222 (FIG. 12). The shape dimensions 1506 may include a shape height, a shape width and, for example, a shape depth. The bubble message viewer 328 may display the shape of the bubble message associated with the bubble message shape data 1502 with dimensions in accordance with the shape dimensions 1506.

The shape color 1508 field may identify the color or color scheme of the bubble message shape, for example, as selected by the bubble message originator with the bubble message editor 312 (FIG. 3), and may include alpha-channel or transparency information. The shape background 1510 field may store or reference one or more shape background specifications, for example, as specified by the bubble message originator with the bubble message editor 312. As described above with reference to FIG. 7, shape background specifications may include images, patterns and special effects. The shape animation 1512 field may store or reference a bubble message shape animation specification specifying a bubble message shape animation to be displayed while the associated bubble message is being viewed, for example, the bubble message shape animation specification may specify a glowing bubble shape with a dynamically changing glow. The shape soundtrack 1514 field may store or reference an audio sequence that may be played, for example, while the associated bubble message is being viewed.

FIG. 16 depicts example bubble message animation data in accordance with an embodiment of the invention. Bubble message animation data 1602 is a suitable example of the bubble message animation data 1216 (FIG. 12) incorporated in the bubble message data 1202. The bubble message animation data 1602 may include a bubble message open animation 1604 and a bubble message close animation 1606. The bubble message open animation 1604 field may store or reference one or more bubble message open animation specifications. The bubble message close animation 1606 field may store or reference one or more bubble message close animation specifications. For example, the bubble message open animation specifications and the bubble message close animation specifications may specify bubble message open animations and bubble message close animations as described above with reference to FIG. 9.

FIG. 17 depicts example bubble message feature data in accordance with an embodiment of the invention. Bubble message feature data 1702 is a suitable example of the bubble message feature data 1218 (FIG. 12) incorporated in the bubble message data 1202. The bubble message feature data 1702 may include a bubble message viewer feature(s) 1704 field, a bubble message savable 1706 field, a bubble message modifiable 1708 field, a bubble message tradable 1710 field, a bubble message copiable 1712 field and a bubble message printable 1714 field.

The bubble message editor 312 (FIG. 3) and the bubble message viewer 328 may each change over time, for example, to accommodate additional features and functionality. As a result, multiple versions of the bubble message editor 312 and/or the bubble message viewer 328 may be installed in the computer networking environment 200 (FIG. 2). In addition, some features of the bubble message viewer 328 may be optional, for example, provided by an optionally installable plug-in, or unavailable on some computing devices 202, 204, 206, 208, 210, 212. The set of features provided by a particular bubble message viewer or expected/desired of the bubble message viewer 328 by a particular bubble message editor or a particular bubble message may be specified in a bubble message viewer feature specification. The bubble message viewer feature(s) 1704 field may include one or more bubble message viewer feature specifications.

Some of the bubble message feature policies implemented by the bubble message feature manager 808 (FIG. 8) of the bubble message viewer 802 may be dependent upon one or more of the bubble message feature data 1702 fields. For example, the bubble message savable field 1706 field may indicate if the bubble message associated with the bubble message feature data 1702 may be saved, for example, to the file system 330 (FIG. 3), or if the bubble message is erased after a single viewing. The bubble message modifiable 1708 field may indicate if the bubble message may be modified, for example, after being saved. The bubble message tradable 1710 field may indicate if the bubble message may be traded, for example, moved or forwarded to a computing device user other than the recipient of the bubble message. The bubble message copiable 1712 field may indicate if duplicates of the bubble message may be made. The bubble message printable 1714 field may indicate if a hardcopy version of the bubble message may be output to a printing device or the like. Bubble message data 1202 (FIG. 12), for example, bubble message feature data fields 1706, 1708, 1710, 1712 and 1714, may be encrypted to inhibit unauthorized modification.

Procedures that may be performed, for example, by components of the system architecture 300 (FIG. 3), to support the bubble messaging mode of communication are now described in more detail.

Figure 18:
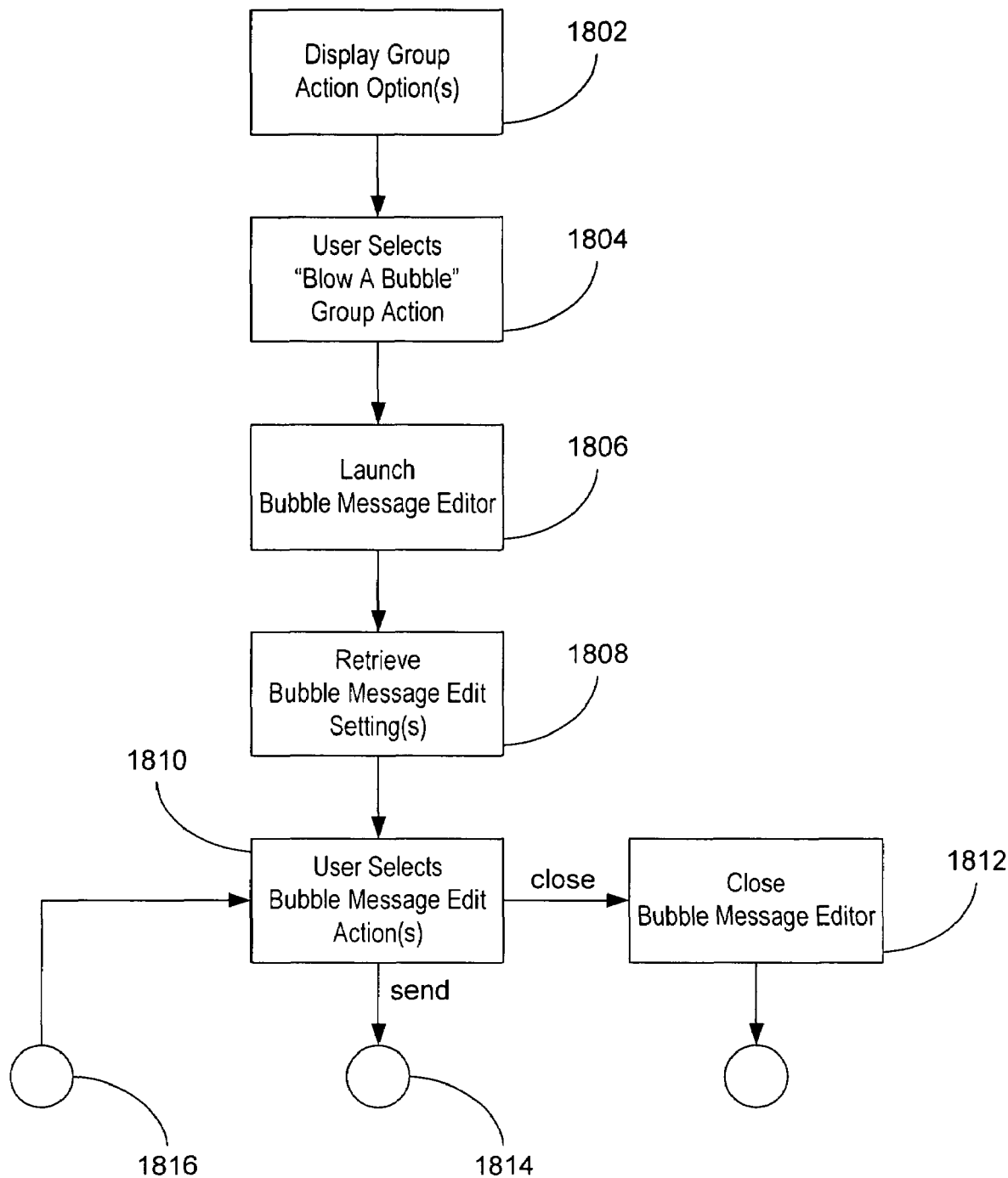
FIG. 18 is a flowchart diagram depicting example steps for originating a bubble message in accordance with an embodiment of the invention.
Figure 19:
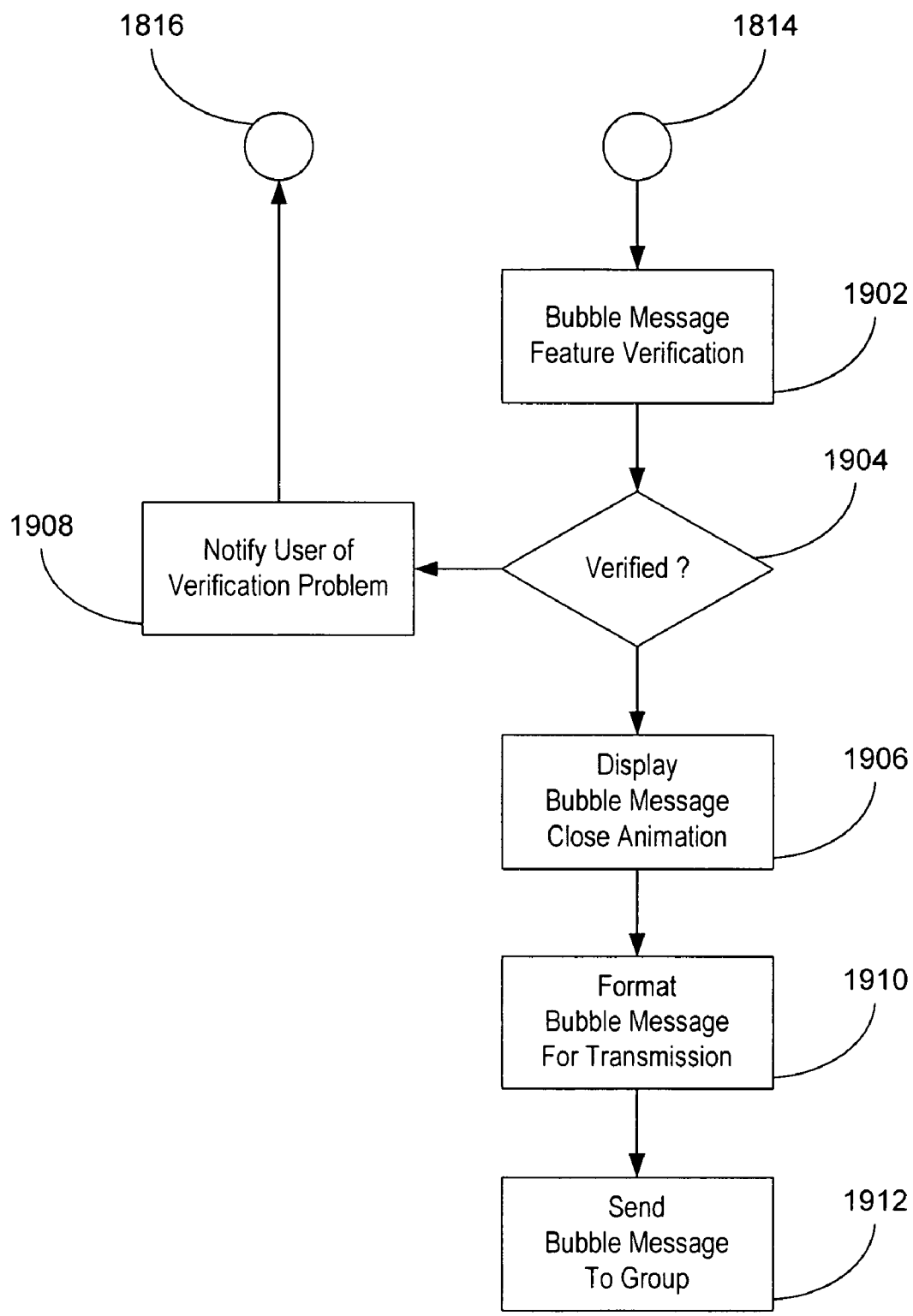
FIG. 19 is a flowchart diagram depicting further example steps for originating a bubble message in accordance with an embodiment of the invention.

FIG. 18 and FIG. 19 depict example steps for originating a bubble message in accordance with an embodiment of the invention. At step 1802, a set of action options for a particular group of potential bubble message recipients may be displayed, for example, in response to a particular user of the sending client computing device 302 (FIG. 3) selecting one of the icons 310 associated with the group of potential bubble message recipients. The set of action options may include "blow a bubble." At step 1804, the sending client computing device 302 user may select the "blow a bubble" group action option.

At step 1806, the bubble message editor 312 (FIG. 3) may be launched, for example, by the graphical user interface workspace 308. Before displaying, for example, the graphical user interface component 500 (FIG. 5) for editing bubble messages, one or more bubble message edit settings may be retrieved at step 1808. For example, the bubble message edit settings may be retrieved by the bubble message editor 312. The bubble message edit settings may include default bubble message data 1202 (FIG. 12). Example steps for retrieving bubble message edit settings are described in more detail below with reference to FIG. 20.

At step 1810, the sending client computing device 302 (FIG. 3) user may select one or more bubble message edit actions, for example, bubble message editing actions described above with reference to FIG. 5, FIG. 6 and FIG. 7. The number of bubble message edit actions selected may be minimal for a quick bubble message creation, or the number of bubble message edit actions selected may be higher for progressively more elaborate bubble message customization. Example steps for processing bubble message edit actions are described in more detail below with reference to FIG. 21.

To complete bubble message editing, the sending client computing device 302 (FIG. 3) user may select the exit bubble message edit action or the send bubble message edit action. If the computing device 302 user selects the exit bubble message edit action, the procedure may progress to step 1812. If the computing device 302 user selects the send bubble message edit action, the procedure may progress to step 1902 of FIG. 19. At step 1812, the bubble message editor 312 may be closed, for example, by the graphical user interface workspace 308, and the bubble message origination procedure terminates without sending the bubble message. Connectors 1814 and 1816 are diagrammatic devices to connect FIG. 18 and FIG. 19.

At step 1902, bubble message feature verification may be performed, for example, by the bubble message feature manager 408 (FIG. 4). Bubble message feature verification may include checking bubble message data 1202 (FIG. 12) for compliance with bubble message feature policies. At step 1904, a determination may be made as to whether or not the bubble message is verified. If the bubble message is verified then the procedure may progress to step 1906, otherwise the procedure progresses to step 1908. At step 1908, the computing device 302 (FIG. 3) user may be notified of one or more bubble message feature verification problems and then the procedure may return to step 1810 (FIG. 18) to allow the problem(s) to be corrected.

At step 1906, the bubble message close animation may be displayed, for example, the bubble message close animation specified by the bubble message close animation 1606 (FIG. 16) field of the bubble message animation data 1602. At step 1910, the bubble message may be formatted for transmission, for example, the bubble message data 1202 (FIG. 12) associated with the newly created bubble message may be formatted by the bubble message formatter 410 (FIG. 4) as described above with reference to FIG. 4. Bubble message contextual data such as bubble message recipient details may also be included in the formatted bubble message. At step 1912, the formatted bubble message may be sent to its intended recipients, for example, to each of the members of the group for which the "blow a bubble" action was selected in step 1804 (FIG. 18). Example steps for sending bubble messages are described in more detail below with reference to FIG. 22.

Before describing example steps for receiving and displaying bubble messages, aspects of bubble message origination are first described in more detail.

Figure 20:
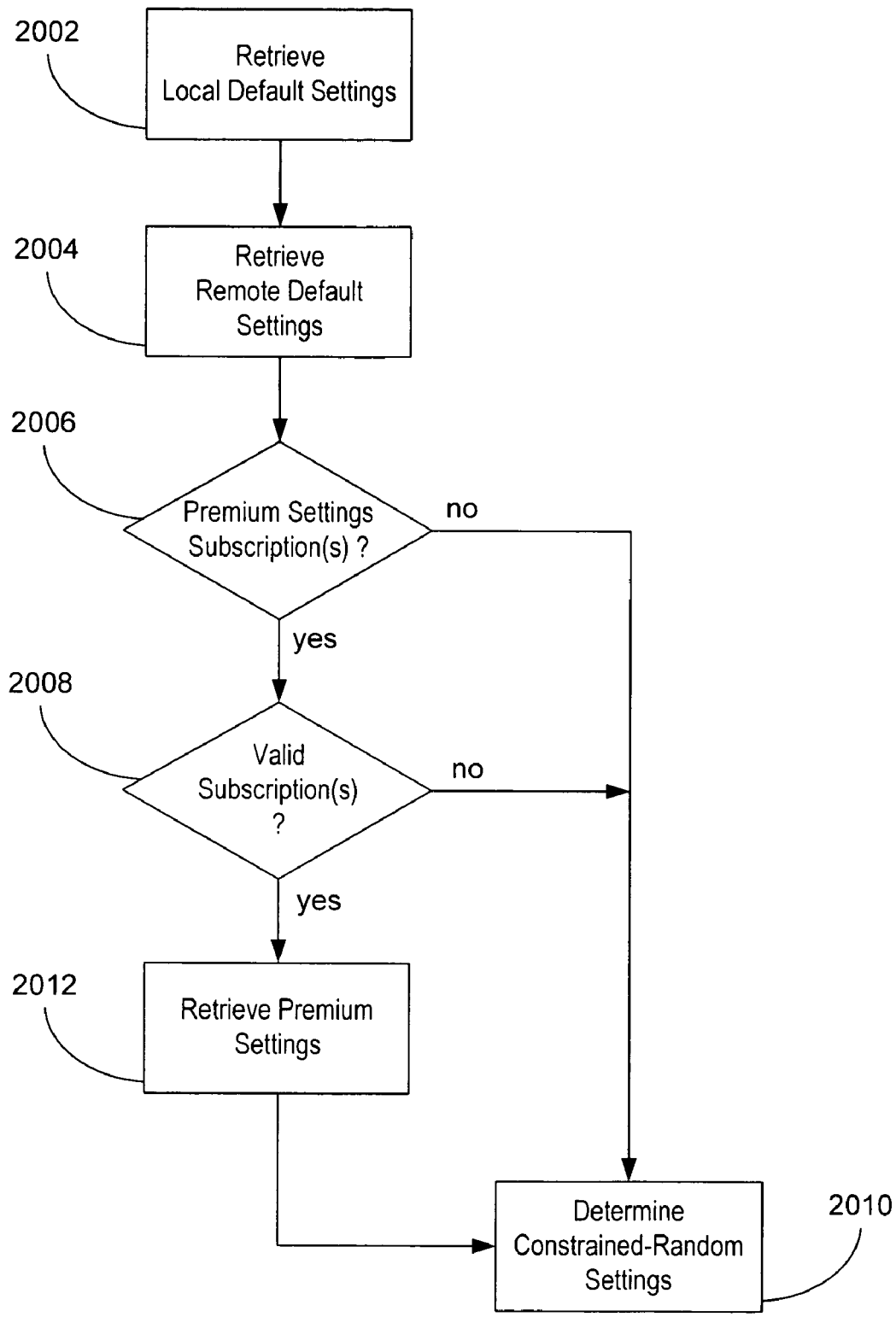
FIG. 20 is a flowchart diagram depicting example steps for retrieving bubble message edit settings in accordance with an embodiment of the invention.

FIG. 20 depicts example steps for retrieving bubble message edit settings in accordance with an embodiment of the invention. At step 2002, default bubble message edit settings local, for example, to the bubble message editor 312 (FIG. 3) may be retrieved. For example, at step 2002, default bubble message edit settings stored at the sending client computing device 302 may be retrieved for the bubble message editor 312. At step 2004, remote default bubble message edit settings may be retrieved. For example, the bubble message editor 312 may retrieve default bubble message edit settings from the server computing device 304 or other remote computing device.

The computing device 302 (FIG. 3) user invoking the bubble message editor 312 may have one or more subscriptions (e.g., paid subscriptions) to premium bubble message edit settings, for example, a quote or poem of the day, premium electronic stickers and/or premium bubble message shapes from a premium service provider. At step 2006, a determination may be made as to whether or not any premium bubble message edit settings subscriptions are present. Premium bubble message edit settings subscriptions may be stored local or remote to the bubble message editor 312. If one or more premium bubble message edit settings subscriptions are present then the procedure may progress to step 2008, otherwise the procedure may progress to step 2010.

At step 2008, the premium bubble message edit settings subscriptions may be checked to determine if they are currently valid. For example, determining that premium bubble message edit settings subscriptions are valid may include cryptographic validation of a subscription token. If one or more of the premium bubble message edit settings subscriptions is currently valid, the procedure may progress to step 2012. Otherwise, the procedure may progress to step 2010. At step 2012, premium bubble message edit settings associated with the premium bubble message edit settings subscriptions may be retrieved. The premium bubble message edit settings be located local or remote to the bubble message editor 312.

At step 2010, one or more bubble message edit settings may be determined in a constrained-random manner, for example, selected with equal probability from a set of candidate values or selected randomly from between a maximum value and a minimum value. Non-linear and/or aesthetically determined constraints may also be utilized, for example, extreme values for bubble message edit settings may be less likely to be selected than average values, or a particular color scheme may be more likely to be selected in combination with a particular bubble message shape. Step 2010 may avoid overriding bubble message edit settings retrieved in steps 2002, 2004 and/or 2012 even if those bubble message edit settings would normally be assigned a constrained-random value.

Figure 21:
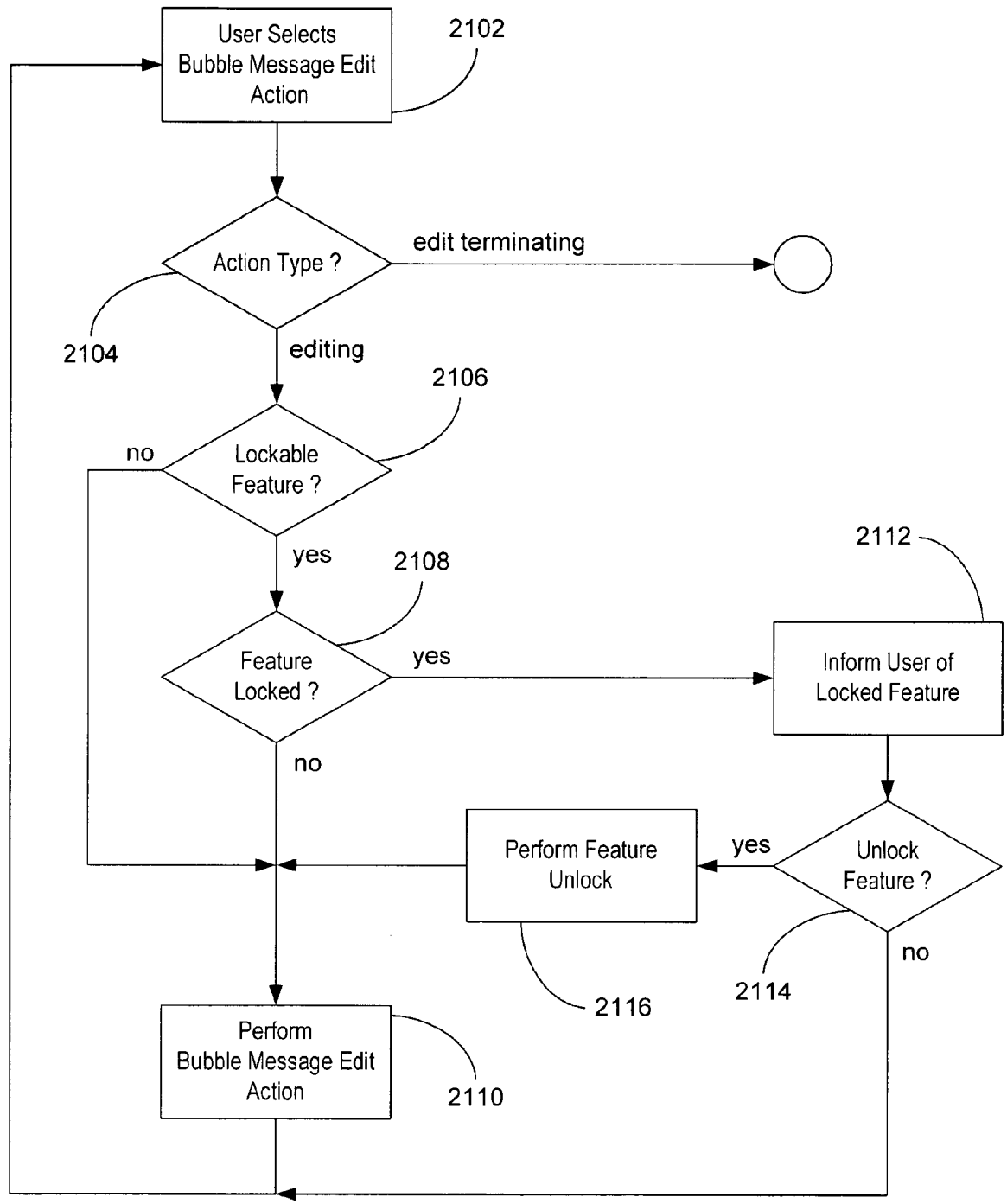
FIG. 21 is a flowchart diagram depicting example steps for processing bubble message edit actions in accordance with an embodiment of the invention.

FIG. 21 depicts example steps for processing bubble message edit actions in accordance with an embodiment of the invention. At step 2102, a particular bubble message edit action may be selected, for example, by the sending client computing device 302 (FIG. 3) user. Candidate bubble message edit actions may include bubble message edit actions resulting from interacting with the graphical user interface component 500 (FIG. 5) for editing bubble messages. Bubble message edit actions may be classified into two types: those actions that may terminate bubble message editing (i.e., edit terminating actions) such as send and close, and those actions that do not terminate bubble message editing (i.e., editing actions) such as actions resulting in a change to bubble message data 1202 (FIG. 12). At step 2104, a determination may be made as to the type of the bubble message edit action selected in step 2102. If the bubble message edit action is one of the edit terminating actions then the procedure may progress as described above with reference to FIG. 18. Otherwise, the procedure may progress to step 2106.

As described above with reference to FIG. 12, some bubble message features may be lockable. At step 2106, a determination may be made as to whether the selected bubble message edit action involves one or more of the lockable bubble message features. If the selected bubble message edit action does involve lockable bubble message features, the procedure may progress to step 2108. Otherwise, the procedure may progress to step 2110. At step 2108, a determination may be made as to whether any of the lockable bubble message features involved in the selected bubble message edit action are locked. If one or more of the lockable bubble message features are locked, the procedure may progress to step 2112. Otherwise, the procedure may progress to step 2110.

At step 2112, the computing device 302 (FIG. 3) user attempting the bubble message edit action may be informed of the one or more locked bubble message features. The computing device 302 user may be offered an opportunity to unlock the locked bubble message features, for example, by obtaining corresponding bubble message feature unlock keys. At step 2114, a determination may be made as to whether the computing device 302 user wishes to unlock the locked bubble message features, for example, the computer device 302 user may accept or reject an offer to purchase corresponding bubble message feature unlock keys. If the locked bubble message features are to be unlocked, the procedure may progress to step 2116. Otherwise, the procedure may return to step 2102 so that the computing device 302 user may select another bubble message edit action.

At step 2116, the locked bubble message features are unlocked, for example, cryptographically unlocked with bubble message feature unlock keys. At step 2110, the bubble message edit action selected by the computing device 302 user at step 2102 may be performed and the procedure may return to step 2102 so that the computing device 302 user may select another bubble message edit action.

Figure 22:
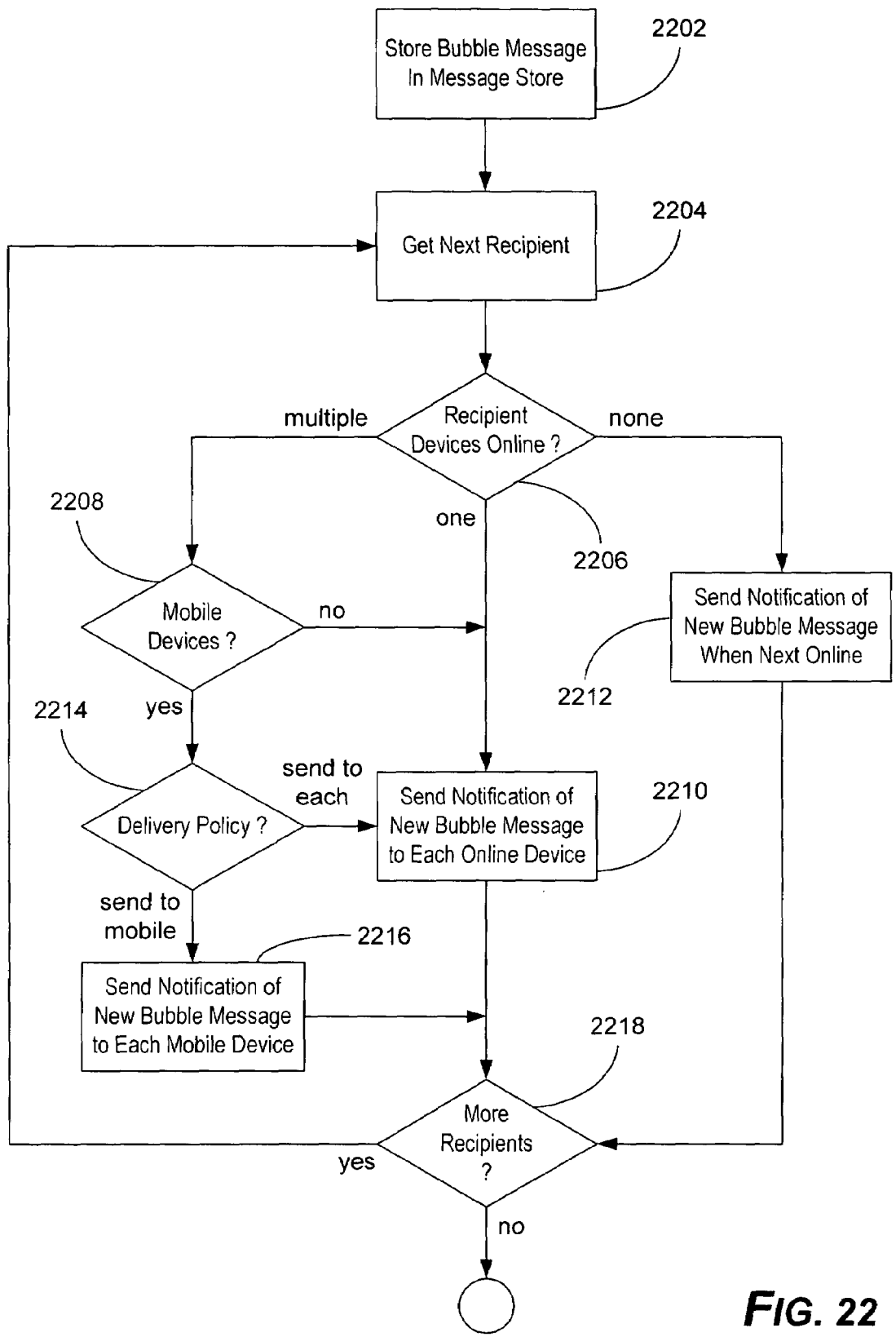
FIG. 22 is a flowchart diagram depicting example steps for sending bubble messages in accordance with an embodiment of the invention.

FIG. 22 depicts example steps for sending bubble messages in accordance with an embodiment of the invention. For example, these steps may be performed by the messaging server 318 (FIG. 3). At step 2202, the new bubble message being sent to one or more recipients may be stored, for example, in the message store 320. At step 2204, one of the intended recipients of the bubble message may be selected, for example, a next recipient in a list of intended recipients. At step 2206, it may be determined if the selected recipient is online with one or more computing devices. Potential bubble message recipients (e.g., users of computing devices 202, 204, 206, 208, 210, 212 of FIG. 2) may be online if, for example, one or more communication connections 114 (FIG. 1) have been established between the server computing device 304 and the receiving client computing device 306 that the potential recipient is utilizing and/or if the potential recipient has authenticated with (or registered with or logged-in to) the messaging server 318. Recipients may be simultaneously online with more than one computing device. If the selected recipient is online with multiple computing devices, the procedure may progress to step 2208. If the selected recipient is online with a single computing device then the procedure may progress to step 2210, otherwise the procedure may progress to step 2212.

At step 2208, it may be determined if any of the selected recipient's online computing devices are mobile computing devices. If one or more of the selected recipient's online computing devices are mobile computing devices, the procedure may progress to step 2214. Otherwise, the procedure may progress to step 2210. At step 2214, the multiple computing device delivery policy may be checked. The multiple computing device delivery policy may indicate that notifications of the new bubble message are to be sent to each mobile computing device, in which case the procedure may progress to step 2216. The multiple computing device delivery policy may indicate that notifications of the new bubble message are to be sent to each online computing device mobile or otherwise, in which case the procedure may progress to step 2210. Similar procedures in accordance with an embodiment of the invention may incorporate any suitable multiple computing device delivery policy. For example, suitable multiple computing device delivery policies need not reference whether the computing device is a mobile computing device.

At step 2216, a notification of the new bubble message may be sent to each online mobile computing device of the selected recipient. At step 2210, a notification of the new bubble message may be sent to each online computing device of the selected recipient. The notification may include a copy of the new bubble message. At step 2212, the messaging server 318, for example, may be configured so that the notification of the new bubble message may be sent to the selected recipient when the selected recipient is next online. At step 2218, it may be determined if there are more intended recipients of the new bubble message. If there are more intended recipients, the procedure may return to step 2204. Otherwise, no more recipients need be notified of the new bubble message.

Figure 23:
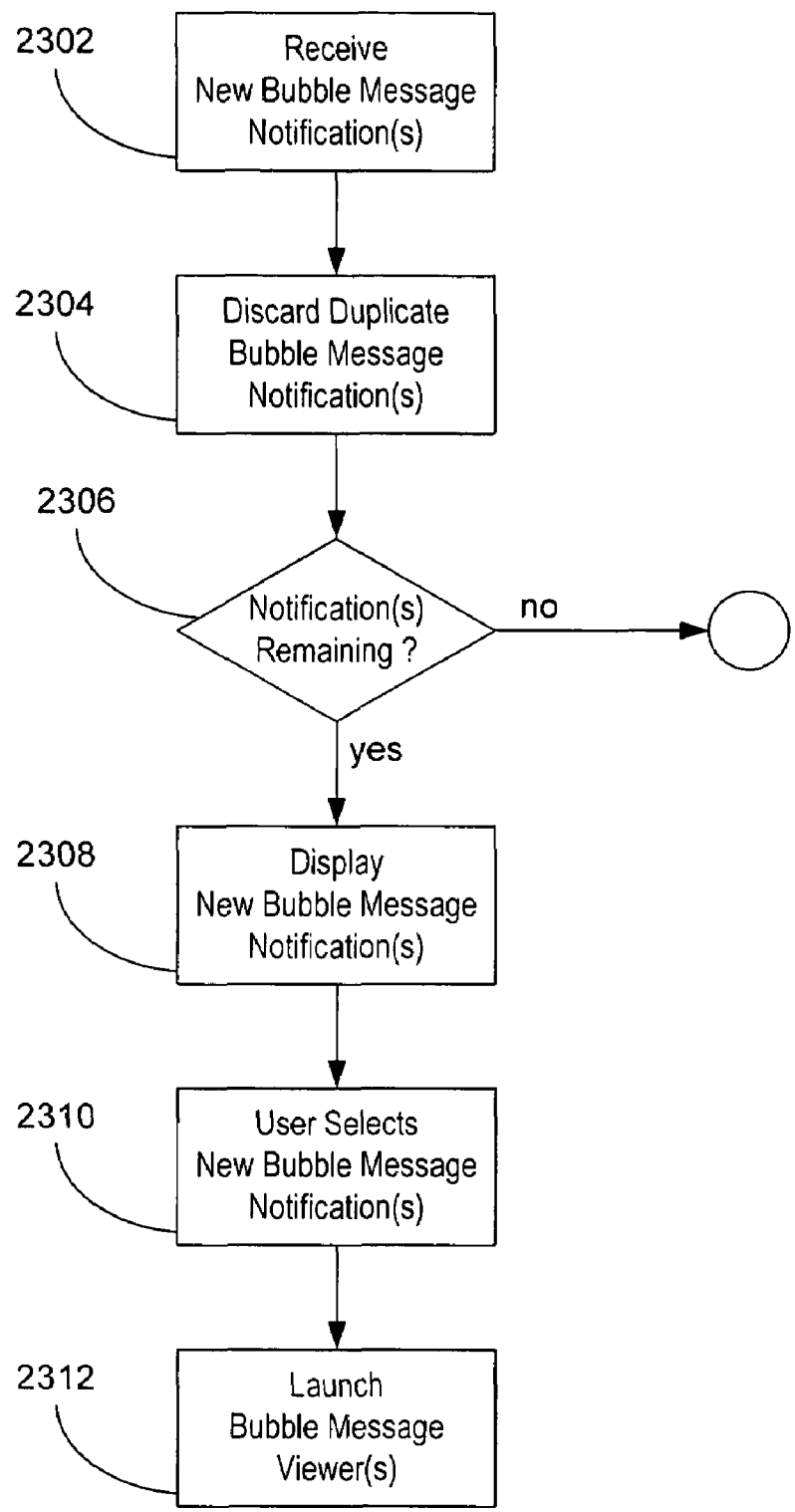
FIG. 23 is a flowchart diagram depicting example steps for receiving bubble messages in accordance with an embodiment of the invention.

Example steps for receiving and displaying bubble messages are now described in more detail. FIG. 23 depicts example steps for receiving bubble messages in accordance with an embodiment of the invention. At step 2302, one or more notifications of new bubble messages may be received, for example, by the messaging client 322 (FIG. 3).

At step 2304, duplicate bubble message notifications may be discarded. It may be possible to receive duplicate bubble message notifications. Received bubble message notifications may be recorded in a history associated with individuals or groups of potential message (e.g., bubble message) senders and/or recipients. Bubble message notifications may include bubble message identification data 1206 (FIG. 12). Received bubble message notifications with bubble message identification data 1206 matching bubble message identification data of bubble message notifications recorded in the history, for example, the recipient group history, may be discarded as duplicate notifications.

At step 2306, it may be determined if each of the new bubble message notifications has been discarded as a duplicate notification. If one or more new bubble message notifications are remaining then the procedure may progress to step 2308. Otherwise, each of the new bubble message notifications has been previously received and displayed. At step 2308, the remaining new bubble message notifications may be displayed. For example, as described above with reference to FIG. 3, the messaging client 322 may display one or more new bubble message indicators in proximity to one of the icons 326 associated with the bubble message sender. A single new bubble message indicator may represent one or more new bubble message notifications. The icon associated with the bubble message sender may represent the bubble message sender or, for example, a group in which the bubble message sender participates.

At step 2310, one or more of the displayed new bubble message notifications may be selected, for example, one or more new bubble message indicators may be selected by a receiving client computing device 306 (FIG. 3) user. At step 2312, a bubble message viewer 328 instance may be launched for each selected bubble message notification. For example, the computing device 306 user may activate a single new bubble message indicator and a single bubble message viewer 328 may be launched as a result. A more sophisticated bubble message viewer launch example is described below with reference to FIG. 24.

Figure 24:
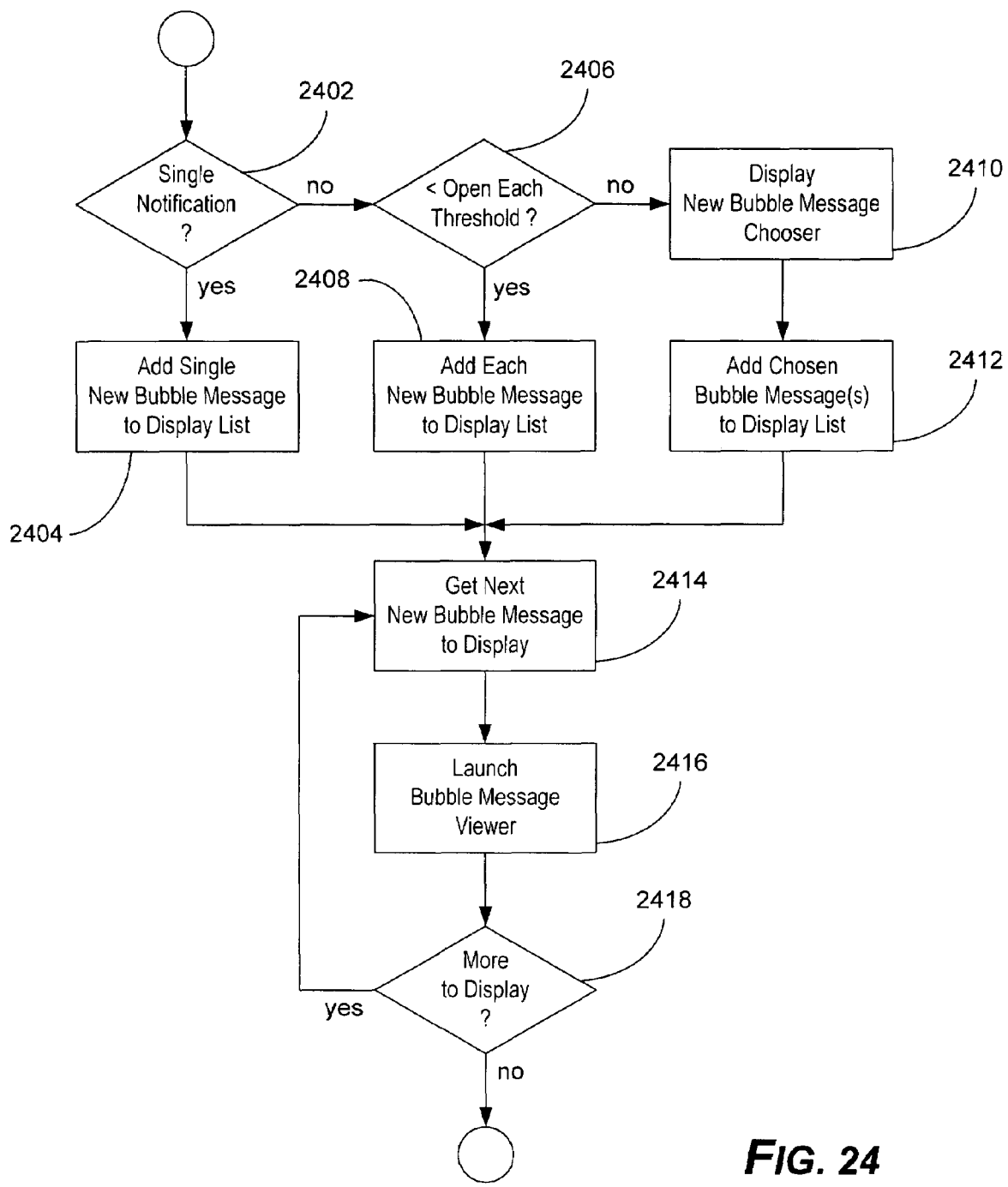
FIG. 24 is a flowchart diagram depicting example steps for launching bubble message viewers in accordance with an embodiment of the invention.

FIG. 24 depicts example steps for launching bubble message viewers in accordance with an embodiment of the invention. At step 2402, a determination may be made as to whether a single new bubble message notification has been selected or more than one new bubble message notification has been selected, for example, by determining whether a single new bubble message indicator corresponds to one new bubble message notification or to more than one new bubble message notification. If a single new bubble message notification has been selected then the procedure may progress to step 2404. Otherwise, the procedure may progress to step 2406.

At step 2406, a determination may be made as to whether a number of selected new bubble message notifications is less than an automatically open each notification threshold, for example, less than 4 selected new bubble message notifications. If the number of selected new bubble message notifications is less than the automatically open each notification threshold then the procedure may progress to step 2408, otherwise the procedure may progress to step 2410. At step 2410, a new bubble message chooser may be displayed. The new bubble message chooser may display a list of bubble message details corresponding to the selected new bubble message notifications. One or more of the bubble messages may be chosen from the new bubble message chooser list.

At step 2412, each of the chosen bubble messages may be added to a bubble message display list. At step 2408, bubble messages corresponding to each selected new bubble message notification may be added to the bubble message display list. At step 2404, the single bubble message corresponding to the single new bubble message notification may be added to the bubble message display list. The bubble message display list may contain bubble messages or references to bubble messages. If the bubble message display list contains references to bubble messages, the bubble messages may be retrieved from local or remote message stores. For example, the messaging client 322 (FIG. 3) may retrieve bubble messages from the message store 320.

At step 2414, a next bubble message may be selected from the bubble message display list. At step 2416, the bubble message viewer 328 (FIG. 3) may be launched to display the selected bubble message. Example steps for displaying the bubble message are described in more detail below with reference to FIG. 25. At step 2418, it may be determined if there are more bubble messages in the bubble message display list. If there are more bubble messages in the bubble message display list then the procedure may return to step 2414 to display the next bubble message. Otherwise, no more bubble message viewers need be launched in response to the present new bubble message notification selection.

Figure 25:
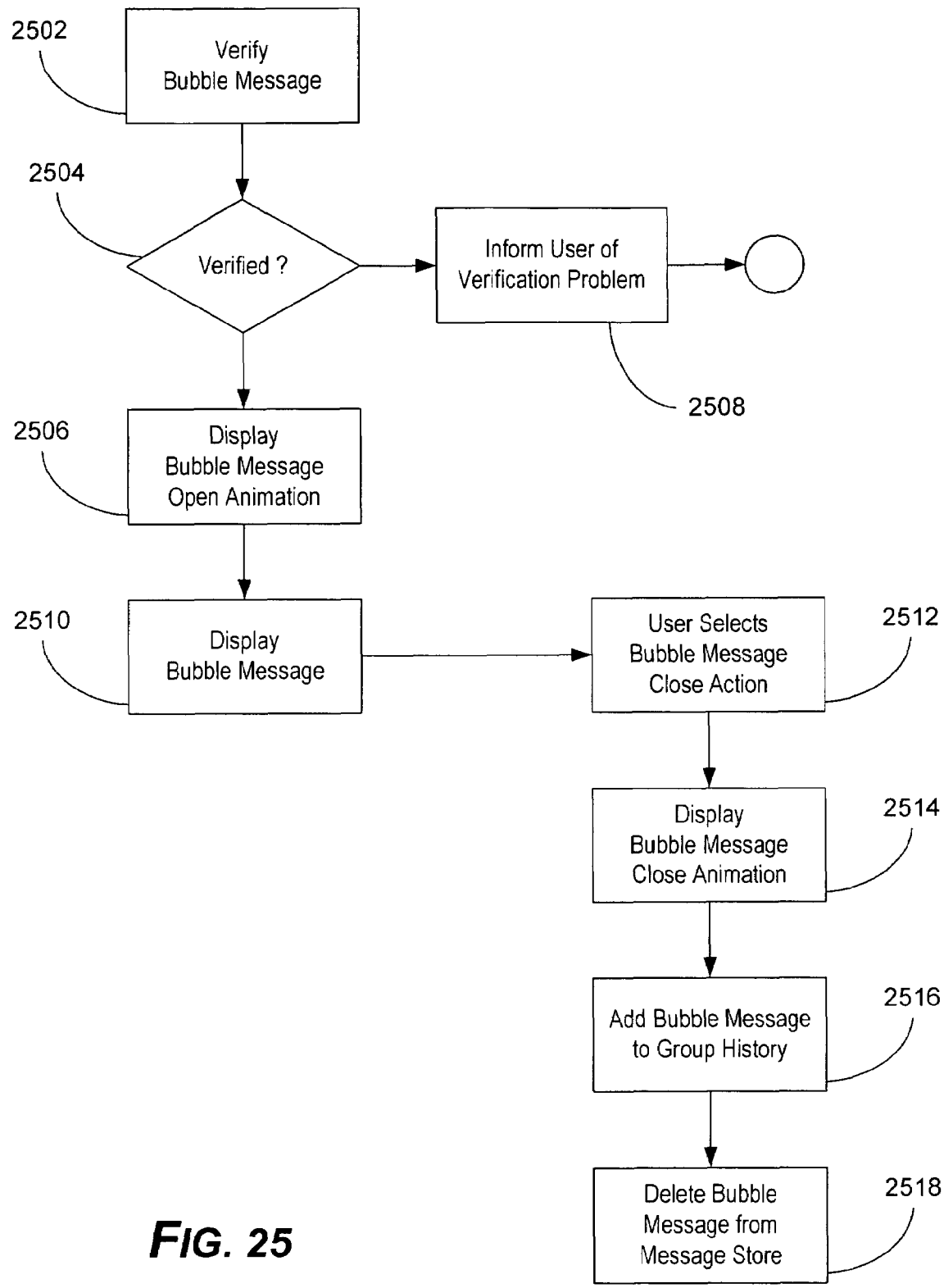
FIG. 25 is a flowchart diagram depicting example steps for displaying bubble messages in accordance with an embodiment of the invention.

FIG. 25 depicts example steps for displaying bubble messages in accordance with an embodiment of the invention. For example, these steps may be performed by the bubble message viewer 328 (FIG. 3). At step 2502, the bubble message to be displayed may be verified, for example, by the bubble message feature manager 808 (FIG. 8). Verifying bubble messages may include checking bubble message data 1202 (FIG. 12) for compliance with bubble message feature policies. At step 2504, it may be determined whether the bubble message to be displayed is verified. If the bubble message to be displayed is verified then the procedure may progress to step 2506. Otherwise, the procedure may progress to step 2508.

At step 2508, the computing device user attempting to view the bubble message (e.g., the user of the computing device 306 of FIG. 3) may be informed of the bubble message verification problem. In the present example, the computing device user may attempt to correct the problem (e.g., obtain suitable bubble message feature unlock keys) before attempting to view the bubble message again. However, in an embodiment of the invention, the computing device user may be presented with opportunities to correct the problem in a manner similar to that discussed above with reference to FIG. 21 and, if the problem is corrected, automatically progressed to step 2506.

At step 2506, the bubble message open animation for the bubble message may be displayed, for example, the bubble message open animation specified by one of the bubble message open animation specifications of the bubble message open animation 1604 (FIG. 16) field. At step 2510, the bubble message may be displayed, for example, as described above with reference to FIG. 9. At step 2512, the bubble message view close action may be selected, for example, by the receiving client computing device 306 (FIG. 3) user. At step 2514, the bubble message close animation for the bubble message may be displayed, for example, the bubble message close animation specified by one of the bubble message close animation specifications of the bubble message close animation 1606 field. At step 2516, the bubble message may be recorded as viewed, for example, the bubble message may be added to the history associated with the group of recipients to which the bubble message was sent. At step 2518, the bubble message copy stored, for example, in the message store 320 may be deleted. Bubble messages in the message store 320 that go unviewed for a bubble message storage period (e.g., 7 days) may be automatically deleted.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computerized method of bubble messaging comprising:
   determining, at a computing device, including a processing unit, configured to send and receive personalized graphical messages, whether a user of a message editor of the computing device is associated with a subscription to premium message edit settings;
   retrieving, at the computing device, one or more particular premium message edit settings when the user is associated with a subscription to the premium message edit settings;
   receiving a selection of a message edit action at the computing device, wherein the message edit action is one of a plurality of message edit actions and a first number of the plurality of message edit actions change data associated with personalized graphical messages and a second number of the plurality of message edit actions terminate personalized graphical message editing;
   determining, at the computing device, whether the message edit action is associated with one or more lockable personalized graphical message features;
   determining, at the computing device, that a lockable personalized graphical message feature of the message edit action is a locked personalized graphical message feature;
      providing, by the computing device, an indication that the lockable personalized graphical message feature is locked;
      providing an option, by the computing device, to purchase personalized graphical message features unlock keys to unlock the lockable personalized graphical message feature;
      receiving input, at the computing device, related to unlocking the lockable personalized graphical message feature;
      creating a personalized graphical message at the computing device using the message edit action after the lockable personalized graphical message feature is unlocked, the personalized graphical message comprising:
         message text; and
         a graphical message shape specification, the graphical message shape specification specifying a shape of the created personalized graphical message when displayed to which a graphical message open animation provides a transition in response to recipient interaction with a display notification of the created personalized graphical message; and
      seamlessly sending the personalized graphical message to at least one recipient from the computing device.

2. The computerized method of claim 1, wherein:
   the personalized graphical message further comprises:
   a graphical message iconic shape specification; and
   a graphical message open animation specification;
   displaying a notification of a received personalized graphical message at the computing device comprises displaying a graphical message iconic shape specified by a graphical message iconic shape specification of the received personalized graphical message; and
   displaying a graphical message open animation at the computing device comprises displaying the graphical message open animation specified by a graphical message open animation specification of the received personalized graphical message.

3. The computerized method of claim 2, wherein:
   the received personalized graphical message further comprises a sender icon; and
   displaying the received personalized graphical message comprises displaying the sender icon of the personalized graphical message.

4. The computerized method of claim 2, wherein the graphical message shape specification comprises:
   a shape identifier;
   shape dimensions; and
   a shape color scheme.

5. The computerized method of claim 1, wherein creating the personalized graphical message comprises performing at least one graphical message edit action as a result of at least one user interaction with a bubble message edit graphical user interface component.

6. The computerized method of claim 1, wherein seamlessly sending the personalized graphical message to at least one recipient comprises sending the personalized graphical message to at least one recipient as a result of at least one user interaction with a bubble message edit graphical user interface component.

7. The computerized method of claim 1, wherein seamlessly sending the personalized graphical message to at least one recipient comprises:
   storing the personalized graphical message in a message store; and
   sending said at least one recipient a notification of the personalized graphical message.

8. The computerized method of claim 2, wherein:
   a shape specified by the graphical message shape specification comprises a bubble shape; and
   the graphical message open animation comprises visually inflating the bubble shape.

9. The computerized method of claim 2, wherein:
   a shape specified by the graphical message shape specification comprises a bubble shape;
   displaying the notification of the received personalized graphical message comprises displaying an iconic form of the bubble shape; and
   the graphical message open animation comprises visually inflating from the iconic form of the bubble shape to the bubble shape.

10. The computerized method of claim 2, wherein:
   displaying the notification of the received personalized graphical message comprises displaying a wrapped gift; and
   the graphical message open animation comprises visually unwrapping the wrapped gift.

11. The computerized method of claim 1, wherein:
a graphical user interface icon is associated with said at least one recipient; and
creating the personalized graphical message occurs as a result of at least one user interaction with the graphical user interface icon associated with said at least one recipient.

12. The computerized method of claim 2, wherein:
a graphical user interface icon is associated with said at least one recipient; and
displaying the notification of the received personalized graphical message comprises displaying the notification of the received personalized graphical message in proximity to the graphical user interface icon associated with said at least one recipient.

13. The computerized method of claim 1, wherein creating the personalized graphical message comprises retrieving at least one default setting.

14. The computerized method of claim 13, wherein retrieving said at least one default setting comprises retrieving at least one remote default setting.

15. The computerized method of claim 1, further comprising:
selecting, at the computing device, a number of message edit settings in a constrained random manner from a set of message edit settings; and
providing the number of message edit settings to the user of the message editor at the computing device.

16. The computerized method of claim 15, wherein selecting a number of message edit settings in a constrained random manner includes utilizing an aesthetically determined constraint.

17. The computerized method of claim 1, wherein the personalized graphical message is unmodifiable after creation.

18. The computerized method of claim 2, wherein displaying the received personalized graphical message comprises verifying that the received personalized graphical message complies with at least one bubble message feature policy.

19. The computerized method of claim 18, wherein said at least one bubble message feature policy comprises a bubble message feature policy inhibiting modification of the received personalized graphical message.

20. A computerized system, comprising a processing unit and a bubble message editor, the bubble message editor configured to perform acts comprising:
receiving a selection of a message edit action, wherein the message edit action is one of a plurality of message edit actions and a first number of the plurality of message edit actions change data associated with bubble messages and a second number of the plurality of message edit actions terminate bubble message editing;
determining whether the message edit action is associated with one or more lockable bubble message features;
determining that a lockable bubble message feature of the message edit action is a locked bubble message feature;
providing an indication that the lockable bubble message feature is locked;
providing an option to purchase bubble message feature unlock keys to unlock the lockable bubble message feature;
receiving input related to unlocking the lockable bubble message feature;
creating a personalized graphical message with the message edit action after the lockable bubble message feature is unlocked, the created personalized graphical message comprising:
message text; and
a graphical message shape specification, the graphical message shape specification specifying a shape of the created personalized graphical message when displayed to which a graphical message open animation provides a transition in response to recipient interaction with a displayed notification of the created personalized graphical message; and
seamlessly sending the created personalized graphical message to at least one recipient.

21. The computerized system of claim 20, wherein:
the created personalized graphical message further comprises a sender icon identifier; and
displaying the created personalized graphical message comprises displaying a sender icon identified by the sender icon identifier of the created personalized graphical message.

22. The computerized system of claim 20, wherein the graphical message shape specification of the created personalized graphical message comprises:
a shape identifier;
shape dimensions; and
a shape color scheme.

23. The computerized system of claim 20, wherein the created personalized graphical message is unmodifiable after creation.

24. The computerized system of claim 20, wherein displaying the created personalized graphical message comprises verifying that the created personalized graphical message complies with at least one bubble message feature policy.

25. The computerized system of claim 24, wherein said at least one bubble message feature policy comprises a bubble message feature policy inhibiting modification of the created personalized graphical message.

* * * * *